US007490089B1

(12) United States Patent
Georgiev

(10) Patent No.: US 7,490,089 B1
(45) Date of Patent: Feb. 10, 2009

(54) METHODS AND APPARATUS FACILITATING ACCESS TO SHARED STORAGE AMONG MULTIPLE COMPUTERS

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 621 days.

(21) Appl. No.: 11/114,913

(22) Filed: Apr. 26, 2005

Related U.S. Application Data

(60) Provisional application No. 60/576,082, filed on Jun. 1, 2004.

(51) Int. Cl.
*G06F 17/30* (2006.01)

(52) U.S. Cl. ............................................ 707/10; 707/1

(58) Field of Classification Search .............. 707/1–10, 707/104.1

See application file for complete search history.

(56) References Cited

U.S. PATENT DOCUMENTS 6,353,898 B1 * 3/2002 Wipfel et al. ................. 714/48
6,658,417 B1 * 12/2003 Stakutis et al. ................ 707/10

* cited by examiner

*Primary Examiner*—Yicun Wu
(74) *Attorney, Agent, or Firm*—Chapin IP Law, LLC; Paul P. Kriz, Esq.

(57) ABSTRACT

A given computer in a cluster communicates with multiple computers in the cluster i) via use of a network supporting communications from the multiple computers amongst each other, and ii) through accesses to the shared storage system to which each of the computers in the cluster have access. Each computer in the cluster i) supports communications over a network connection to the other computers and ii) includes a link (e.g., a fiber channel) directly to the shared storage system. Thus, if one communication path fails such as the network path, the other communication path such as the independent link to the shared storage supporting the ability to read/write to storage provides a backup means of communicating. Attributes associated with a cluster can therefore be properly maintained via the members even during a failure.

28 Claims, 26 Drawing Sheets

| | |
|---|---|
| 1 | REVISER WRITES WISH IN THE WISH AREA AND WAITS FOR WISH_GRANT AMOUNT OF TIME. |
| 2 | GUARDIAN READS THE WISH AND SILENTLY ACCEPTS. |
| 3 | REVISER READS THE WISH AND FINDS IT INTACT - ACCEPTED. |

| | |
|---|---|
| 1 | REVISER WRITES WISH IN THE WISH AREA AND WAITS FOR WISH_GRANT AMOUNT OF TIME. |
| 2 | GUARDIAN READS THE WISH AND FINDS IT UNACCEPTABLE. |
| 3 | GUARDIAN DENIES THE WISH BY WRITING NULL ID INTO WISH AREA. |
| 4 | REVISER READS THE WISH AND FINDS IT ALTERED – DENIED. |

METHODS AND APPARATUS FACILITATING ACCESS TO SHARED STORAGE AMONG MULTIPLE COMPUTERS

RELATED APPLICATIONS

This application claims the benefit of U.S. Provisional Application No. 60/576,082 entitled "METHODS AND APPARATUS SUPPORTING SHARED USE OF STORAGE," filed on Jun. 1, 2004, the entire teachings of which are incorporated herein by this reference. This application is also related to:

i) co-pending U.S. patent application Ser. No. 11/114,905 entitled "METHODS AND APPARATUS FACILITATING ACCESS TO SHARED STORAGE AMONG MULTIPLE COMPUTERS," describing functionality associated with transaction management, ii) co-pending U.S. patent application Ser. No. 11/115,041 entitled "METHODS AND APPARATUS FOR SHARED STORAGE JOURNALING," describing functionality associated with journaling, iii) co-pending U.S. patent application Ser. No. 11/114,943 entitled "METHODS AND APPARATUS FACILITATING VOLUME MANAGEMENT," describing functionality associated with volume management, iv) co-pending U.S. patent application Ser. No. 11/115,098 entitled "METHODS AND APPARATUS FACILITATING ACCESS TO STORAGE AMONG MULTIPLE COMPUTERS," describing functionality associated with operation locks among computers in a cluster, all of which have been filed on the same date as the present application, the entire teachings of which are also incorporated herein by this reference.

BACKGROUND

In certain conventional applications, computer systems sometimes include one or more processors and corresponding software that supports access to corresponding externally attached storage. For example, according to certain conventional applications, multiple computers may couple to a common shared storage system that stores large volumes of data. Two or more of the computers may be afforded access to the same files stored in the shared storage system.

To prevent file corruption, conventional applications supporting access to the shared storage typically employ some means for preventing two or more users from modifying the same file at the same time. Otherwise, the two or more computers having shared access to a given file in the shared storage system may simultaneously access and modify the same file. For example, one user may modify the file with a first set of changes. Another user may attempt modify the file with a second set of changes. Without an accounting for each user's changes, some of the changes to the file may be lost when the users eventually store the modified file back to the shared storage system. Thus, it is quite possible in such applications that the latter user writing the file to storage may overwrite changes by the first user storing the file to storage. Thus, simultaneous access to the same file in storage is sometimes avoided altogether.

There exist conventional techniques to enable multiple users to modify the same file in a storage system. For example, according to one conventional application, each of multiple computers couple to a server device that, in turn, selectively provides access to a corresponding storage system. While a first user at a corresponding computer modifies a file in the storage system, the server device prevents other users from accessing (e.g., writing to) the same file to prevent two different users from simultaneously modifying the same file. After the first user completes any modifications and updates to the file in the storage device, the server device may allow another user to access the file in the storage system. Thus, the server device prevents corruption of shared files in the storage system by restricting access to any files presently being modified by other users. In other words, only one user is allowed to access and modify a file at a time.

Independent of the above discussion regarding shared access to storage, a "computer cluster" is a group of interconnected computers that work together as a parallel computer on the same process. Thus, processing tasks can be distributed among multiple processing nodes to achieve a common goal. One popular implementation of a cluster includes computers running Linux™ as the operating system and Beowulf™ software to implement the parallelism. Most mature cluster implementations attempt to eliminate single points of failure so that an overall system is fault tolerant.

Clusters were originally developed by Digital Equipment Corporation in the 1980s. Certain cluster implementations not only support parallel computing, but also support shared use of file systems and peripheral devices. In general, parallel computing involves the simultaneous execution of the same task (split up and specially adapted) on multiple processors in order to obtain faster results.

SUMMARY

Conventional computer applications that support access to files in a shared storage system suffer from a number of deficiencies. For example, certain conventional applications enable only a single computer to access and modify a file in the shared storage at any given time. There is no communication or coordination among the multiple distributed computers to access the shared storage.

Much of the complexity and inflexibility in conventional network storage installations is an artifact of legacy file systems and volume management tools that were not originally designed nor easily adapted to support networked storage environments. In general, conventional file system applications do not allow multiple computers in a network to easily negotiate access to data regions of remotely located shared storage.

Utilization of conventional clustering techniques has generally been limited to computers that operate on the same processing task that do not compete with each other but rather work together and share processing responsibilities. In contradistinction to conventional methods, embodiments of the invention enable users to perform separate and independent processing tasks (which potentially compete with each other) that operate on shared storage to more fully utilize the capability of their network storage hardware.

For example, embodiments of the invention as described herein can be implemented to support network environments in which multiple computers form a cluster and have access to a volume in a SAN (Storage Area Network). Use of clustering techniques herein enables users to easily manage networked storage as a single pool of data, greatly reducing complexity and giving users much more flexibility in how the users can access their data. One embodiment of the invention has been designed to support multiple operating systems and storage hardware platforms in a wide variety of complex environments demanding very high reliability. Embodiments of the invention therefore significantly overcome the aforementioned and other deficiencies of conventional network management applications in which only one computer in a cluster can modify a file at any given time.

Cluster processing according to an embodiment of the invention provides benefits over single machine processing such as load balancing. That is, computers in a cluster compete for shared storage access and coordinate amongst themselves so that overhead tasks associated with maintaining the cluster are distributed so that no computer machine in the cluster is overloaded while another one is idle. Additionally, clustering techniques herein enhance fault resistance because, even if some members of the cluster fail, processing is redirected to other computers in the cluster. Further, clustering techniques herein enhance extendibility. That is, new machines can be added or dropped from a cluster so the number of computers accessing shared storage can change over time depending on current demand. Finally, clustering techniques of the invention render shared storage (such as a SAN) an attractive alternative to local storage distributed amongst each of multiple computers in a network. Common data storage at a single location is easier to backup than multiple storage devices spread among different machines.

As discussed, a particular embodiment of the invention includes mechanisms and techniques for enabling multiple computers in a cluster to have concurrent shared access to a storage system. Each computer in the cluster executes a cluster manager application that interfaces to a transaction manager application to coordinate access to shared storage locations (such as a volume or portions thereof) in a storage system. The transaction managers at each of the multiple computers utilize a unified address space that maps locations in the storage system to corresponding access properties maintained by respective transaction managers in the computers. The access properties (e.g., byte properties) indicate an access status of the regions or locations (potentially down to a byte granularity) in the shared storage system. In one embodiment, the access properties associated with the unified address spaces are stored locally at each computer in a given cluster.

In one embodiment of the invention, the object-based clustered file system as described herein can be used in enterprise and high performance storage environments. As discussed in related applications, the file system may also support journaling for fast recovery, advanced locking mechanisms for file sharing, innovative design for fast access to files, complete SAN-NAS integration, etc. The techniques herein can be used in conjunction with other applications such as the transaction manager, journaling, and operation locks application, etc. as discussed in related applications to achieve this end.

In one embodiment, the file system application supports/operates with Windows 2000, XP, 2003 and any block data transfer protocol like Fibre Channel, iSCSI or SCSI. Thus, embodiments of the invention are directed towards an application capable of enabling multiple computers running different operating systems coordinated access to shared storage. The same version of a cluster manager application can be developed to operate on different operating systems on different computers in a cluster yet still facilitate access to the shared storage system. Thus, computers in a cluster may run different operating systems and yet still facilitate access to the shared storage. In one embodiment, the cluster manager application operates with each of the different operating systems so that corresponding computers can negotiate access to portions of shared storage.

More general embodiments of the invention include a technique of maintaining attributes of a cluster of computers or processes having concurrent access to shared storage. Each of multiple computers having access to the shared storage includes an application (e.g., cluster manager application) that facilitates maintaining information of a cluster of computers having access to shared storage. The members of the cluster share responsibilities or duties associated with maintaining the cluster among themselves such as adding new member, detecting and deleting failed members, etc. so that members of the cluster can access the shared storage system without corrupting its contents. In certain cases, a member of the cluster is designated as an "active" member in the cluster to perform certain functions.

An example embodiment of the invention includes a technique of maintaining a list identifying which of multiple computers are members of a cluster of computers having access to a shared storage system. A given computer in the cluster communicates with the multiple computers in the cluster i) via use of a network supporting communications from the multiple computers amongst each other, and ii) through accesses to the shared storage system to which each of the computers in the cluster have access. In one embodiment, each computer in the cluster i) supports communications over a network connection to the other computers and ii) includes a link (e.g., a fiber channel) directly to the shared storage system. Thus, if one communication path fails such as the network path, the other communication path such as the link to the shared storage supporting the ability to read/write to storage provides a backup means of communicating amongst each other so that attributes associated with a current cluster are properly and currently maintained. Based on communications over the network and potentially through the shared storage system, a given computer in the cluster can initiate a modification to a list of members included in the cluster.

In one embodiment, each of the computers in a given cluster maintains a list identifying other computers also in the cluster. Additionally, regions of the shared storage system such as a storage area network include designated regions or locations for maintaining a list of members of a cluster having access to a volume in the shared storage system.

Based on knowledge of who is in the cluster, a given computer in the cluster may communicate with other members of the cluster to ensure that they are still "alive." For example, the computers in a cluster may transmit occasional heartbeat messages (e.g., continuous streams of delayed messages) amongst each other over the network to indicate that they are still participating members of the cluster.

In the event that a member of the cluster experiences a failure or cannot communicate over the network, the failing member may be removed from the cluster based on initiation of a routine by a non-failing member of the cluster. Thus, more generally, embodiments of the invention support identifying which if any of the multiple computers in the cluster lacks an ability to communicate with each of the other computers in the cluster. In response to the communicating, embodiments further support initiating removal of any computers from the list in which the corresponding computers lack the ability to communicate with each of the other computers in the cluster. This avoids a situation in which a member in the cluster unilaterally modifies portions of the shared storage without coordinating first with other members in the cluster.

In further embodiments and potentially other independent embodiments of the invention, the method (and apparatus) of the invention further involves members of the cluster reading and writing data to designated locations in the shared storage. For example, the reading and writing to the designated locations of the shared storage system can occur in response to a non-member of the cluster trying to join the cluster but who is unable to communicate with other computers over the network.

In one embodiment, the multiple computers communicate via a communications session such as a TCP/IP communication session over a network. Each of the corresponding computers in the cluster has a corresponding link to access the shared storage, the corresponding link (e.g., a fiber channel) being independent of the network. This eliminates contention for transmitting data on the network and the independent link to the shared storage.

In another embodiment, a given computer in the cluster detects a failed computer in the cluster based on lack of receiving messages from the failed computer. In response to detecting lack of receiving messages, the given computer in the cluster notifies other non-failing computers in the cluster of multiple computers of the failed computer. Thereafter, the given computer initiates a routine to remove the failed computer from being a member of the cluster. Consequently, any computer in the cluster that is unable to communicate over the network to the other computers in the cluster may be ousted from the cluster to prevent data corruption to the shared storage system. If the failed computer were allowed to stay in the cluster, the failed computer may not be able to properly coordinate accesses to the shared storage without potentially corrupting data. Thus, one aspect of the invention is to enable access (reads and/or writes) to shared storage depending on whether the computer can communicate with other computers in the cluster over the network connection.

After initiating removal of the failed computer from the list so that the failed computer is no longer a member of the cluster, the computer in the cluster initiating the removal communicates with other members in the cluster over the network to identify that the failed computer is no longer a member of the cluster. Consequently, the remaining members of the cluster other than the failed computer update their corresponding lists to remove the failed computer from the cluster. In this way, each member of the cluster maintains an updated list of other members in the cluster to which it must communicate or coordinate efforts in accessing to the shared storage.

In another embodiment, a given computer in the network communicates with the multiple computers in the cluster through accesses to the shared storage system. This includes reading a designated location in the shared storage system to identify a request by another computer not in the cluster to join the cluster. The given computer reading the location in shared storage may detect that its own unique computer identifier is not included in the designated location and, that the other computer (the one writing its unique identifier to the designated location) is attempting to form a cluster without the given computer. In response, the given computer writes to the designated location in the shared storage to indicate that the request to join the cluster will not be granted. In this case, there is no direct communication over the network from one computer to the other. Instead, the shares storage acts as a repository for messages that are accessed by multiple computers in a network environment. Communication occurs when one computer writes to the location and another computer reads from the location over a link independent of the network.

When the other computer (attempting to obtain exclusive rights) reads the designated location, it will realize that another computer wrote to the designated location to reject its request. In this way, computers in a network environment are able to communicate with each other even though they may be unable to communicate over the network. For example, writing or overwriting data to the designated location in the shared storage system prevents new cluster formations for access to the shared storage when computers requesting to join the cluster cannot communicate over the network to current members of the cluster.

In the event that the data stored in the designated location includes an identifier of the given computer, the other computer may be granted permission to create a new cluster or modify an existing cluster. For example, a given computer in a cluster communicates with the multiple computers in the cluster through accesses to the shared storage system which involves reading a designated location in shared storage of to identify a request by another computer not in the cluster to form a new cluster. The given computer reading the designated location detects that an identifier of the at least one computer is included in information stored at the designated location. In response, the given computer refrains from writing to the designated location to indicate that the request to create the new cluster will be granted.

From the perspective of the computer requesting to create the cluster by writing its identifier to shared storage, the computer writes data to a designated location in the shared storage system to request a change to the list of members identified in the cluster. The computer may also list identifiers of other computer in the network that wish to be part of a cluster. In one embodiment, the computer learns of other computers wishing included in the cluster based on communications over the network. After writing a cluster wish to shared storage, the computer waits a specified period of time and reads a content of data at the designated location to identify whether its request has been denied by another computer overwriting the data at the designated location. If the data written by the computer in the designated location is overwritten by another computer during the wait period, the computer acknowledges that another computer (e.g., the one doing the overwriting of data to the designated location) in the network environment denies the request.

After initiating an addition of a computer, which is coupled to the network and the shared storage system to be a new member of the cluster, the given computer notifies other members of the cluster of the new member. For example, the given computer communicates over the network to the other members of the cluster. The given computer then writes an updated list of members in the cluster including the new member to a designated location in shared storage. The updated list identifies computers in the cluster capable of accessing a common volume in the shared storage system. Consequently, in the event that a single computer in the cluster fails, other computers in the network environment may access the shared storage system to identify at least which members were previously part of an active cluster. Maintaining a list of members of the cluster at each computer member enables the computers to identify which other computers compete, via communications and lockout mechanisms, for access to the same files or portion thereof in shared storage.

In further embodiments of the invention, the method (and apparatus) of the invention further involves facilitating access to a shared storage system among multiple computers. In one of multiple computers coupled to communicate over a network and also having access to the shared storage system, the technique involves retrieving information from the shared storage system identifying a list of members associated with a cluster of computers having access to a common volume in the shared storage system. The computer transmits a query message to the members identified in the current list over the network. The computer receives responses from the members over the network based on the query message and then compares the list of members retrieved from the shared storage system with a list of members that reply to the query to identify non-responding members. Non-responding members are potentially terminated from being included in the cluster.

In one embodiment, the computer detecting the non-responding member writes to a designated location in the shared storage system including identifiers associated with the non-responding members. Thus, in the event of a further failure by the computer, the information regarding of the non-responding computer is available to other computers in the network environment who at some point may opt to replay journals associated with the non-responding computers to avoid corruption of the shared storage system. In other words, a remaining healthy member of the network environment may read the designated location to identify which computers fail and which corresponding journals in the shared storage should be replayed for repair purposes.

In other embodiments, a computer in the cluster may receive a message from at least one computer in the network that wants to be added to or deleted from the cluster. For example, a member of the cluster may receive a message from a computer in the network that is identified in the list of members but who wants to be removed from the cluster.

When attempting to add a computer to the cluster, one of the computers in the cluster writes data to a designated location in the shared storage system, the data including a list of the non-responding members in the cluster (based on attempted communications over the network) as well as the at least one computer that wishes to be added to the list of members in the cluster. Consequently, based on communications to the shared storage, a member of the cluster can attempt to remove non-responding computers as well as add computers explicitly requesting to be added to the cluster.

According to further embodiments, techniques of the invention include allocating a portion of the shared storage system to store data. Multiple computers have access to the allocated portion of the shared storage system to compete for acquiring exclusive rights associated with modifying a membership of computers in a cluster having access to a corresponding region in the shared storage system. After obtaining the exclusive rights, the corresponding computer in the network environment writes data to the portion of shared storage to prevent another computer in the network environment from obtaining the exclusive rights.

After the given computer obtains the exclusive rights, the given computer retrieves information from the shared storage system identifying a list of members associated with the cluster of computers having access to the corresponding region in the shared storage system. The given computer then transmits a query message to the members identified in the list over the network. Based on the query, the given computer receives responses from the members over the network and compares the list of members retrieved from the shared storage system with a list of members that reply to the query to identify non-responding members. The given computers then modifies the cluster to include a different set of members. Modifying the cluster to include a different set of members includes adding the given computer to the membership of computers in the cluster so that the given computer is added to the cluster and can also access the corresponding region in the shared storage system.

At some point after obtaining the exclusive rights to modify the membership in a cluster, a given computer can release exclusive access rights associated with modifying the membership by discontinuing to overwrite data in the portion of the shared storage system. Thus, when another computer writes to the portion of shared storage, the given computer (previously having the exclusive rights) will not overwrite the data of the other computer trying to obtain the exclusive rights.

According to one embodiment, retaining exclusive rights includes overwriting an identifier (in the portion of the shared storage) associated with and written by the other computer in the network environment attempting to obtain the exclusive rights. Thus, when the other computer attempting to obtain exclusive rights reads that its previously written identifier has been overwritten by another computer having access to the shared storage, the computer attempting to obtain exclusive rights knows that the request has been denied. In this way, multiple computers in a network environment can compete amongst themselves to be one of many distributed computers having certain functional rights over others in the network environment. Thus, functional operations of the distributed computers via corresponding cluster managers ensures that only one computer is "active" at a time.

In one embodiment, a given computer in the network environment acquires exclusive rights associated with modifying a membership of computers in a cluster having access to a corresponding region in the shared storage system. The given computer retrieves information from the shared storage system identifying a current list of members in the cluster. Based on the retrieved information, the given computer having the exclusive rights transmits a message to the current list of members in the cluster indicating that the given computer wishes to exit the cluster.

As discussed above, acquiring the exclusive rights (e.g., acquiring disk spin lock as will be discussed later in this specification) involves the given computer writing data to an allocated portion of the shared storage system. After writing the data to the shared storage system, the given computer waits a specified period of time (which is longer than an amount of time that a computer with exclusive rights would overwrite the allocated portion of shared storage. After waiting the specified period, the given computer reads data from the allocated portion to determine whether another computer in the network environment overwrote the data previously written by the given computer and, i) if so, acknowledges that the given computer did not obtain the exclusive rights, and ii) if not, acknowledges that the given computer did obtain the exclusive rights.

In another embodiment, after transmitting the message to the current list of members in the cluster, the corresponding computer receiving acknowledgment messages from the members. The computer then generates a notification message to the current list of members identifying that the given computer requests to be removed from the cluster and writes an updated list of members in the cluster to the shared storage system, in which the updated list does not identify inclusion of the given computer.

Other embodiments of the invention include a technique (e.g., method and apparatus) supporting shared access to storage in an environment including multiple computers. The techniques include providing a cluster manager application at each of the multiple computers in the environment to facilitate coordination of access to locations in the storage system. The cluster managers work in conjunction with the transaction managers at each of the multiple computers to utilize a unified address space that maps locations in the storage system to corresponding access properties maintained by respective transaction managers. Access properties indicate an access status of the locations associated with the storage system, the transaction managers at each of the multiple computers support operations of: i) receiving a request to access data stored in the shared storage system; ii) identifying a unique address in a unified address space associated with the data stored in the shared storage system; iii) utilizing the unique address to retrieve access properties associated with the data in the shared storage system; and iv) based on the retrieved access properties, identifying whether other computers in the environment have requested contemporaneous access to the data and, if so, communicating with other computers in the cluster accessing a common storage location of the storage system to resolve conflicts associated with multiple computers attempting to access the common storage location of the storage system.

As discussed, techniques of the invention are well suited for use in applications in which multiple computers in a networked computer system communicate (e.g., arbitrate negotiate, coordinate, compete, etc.) amongst each other to coordinate access to the same regions of shared storage. However, it should be noted that embodiments of the invention are well suited for other than the above discussed applications and thus are not limited to such use.

One embodiment of the invention includes a computerized device (e.g., a host computer, workstation, etc.) configured to support the aforementioned method operations disclosed herein as embodiments of the invention to access shared storage. In such an embodiment and related embodiments, the computerized device includes a display, a memory system, a processor (e.g., a processing device) and an interconnect (e.g., electronic circuitry such as a data bus, data transfer circuit, etc.). The interconnect supports local communications among the display, the processor and the memory system. The computerized device also includes a network interface supporting communications with other computers. The memory system is encoded with a corresponding cluster manager application that, when executed on the processor, produces a cluster manager process. The cluster manager application as well as other related functions support all of the method embodiments and operations explained herein as embodiment of the invention.

Yet other embodiments of the invention disclosed herein include software programs to perform the method embodiment and operations summarized above and as further disclosed in detail below under the heading Detailed Description of Preferred Embodiments. More particularly, a computer program product (e.g., a computer-readable medium) including computer program logic encoded thereon may be executed on a computerized device to support operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One embodiment of the invention is directed to a computer program product that includes a computer readable medium having instructions stored thereon for supporting management of network resources. The instructions, when carried out by a processor of the first data communication device, cause the processor to perform the steps of: a.) maintaining a list identifying which of the multiple computers are members of the cluster having access to the shared storage system; b.) communicating with the multiple computers in the cluster i) via use of a network supporting communications from the multiple computers amongst each other, and ii) through accesses to the shared storage system to which each of the computers in the cluster have access; and c.) initiating a modification to members included in the cluster based upon communications over the network and through the shared storage system. Other arrangements of embodiments of the invention that are disclosed herein include software programs to perform any of the method embodiment steps and operations summarized above and disclosed in detail below.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

An example embodiment of the invention includes a technique of maintaining a list identifying which of multiple computers are members of a cluster of computers having access to a shared storage system. A given computer in the cluster communicates with the multiple computers in the cluster i) via use of a network supporting communications from the multiple computers amongst each other, and ii) through accesses to the shared storage system to which each of the computers in the cluster have access.

In one embodiment, each computer in the cluster i) supports communications over a network connection to the other computers and ii) includes a link (e.g., a fiber channel) directly to the shared storage system. Thus, if one communication path fails such as the network path, the other communication path such as the link to the shared storage supporting the ability to read/write to storage provides a backup means of communicating amongst each other so that attributes associated with a current cluster are properly and currently maintained. Based on communications over the network and potentially through the shared storage system, a given computer in the cluster can initiate a modification to a list of members included in the cluster.

Figure 1:
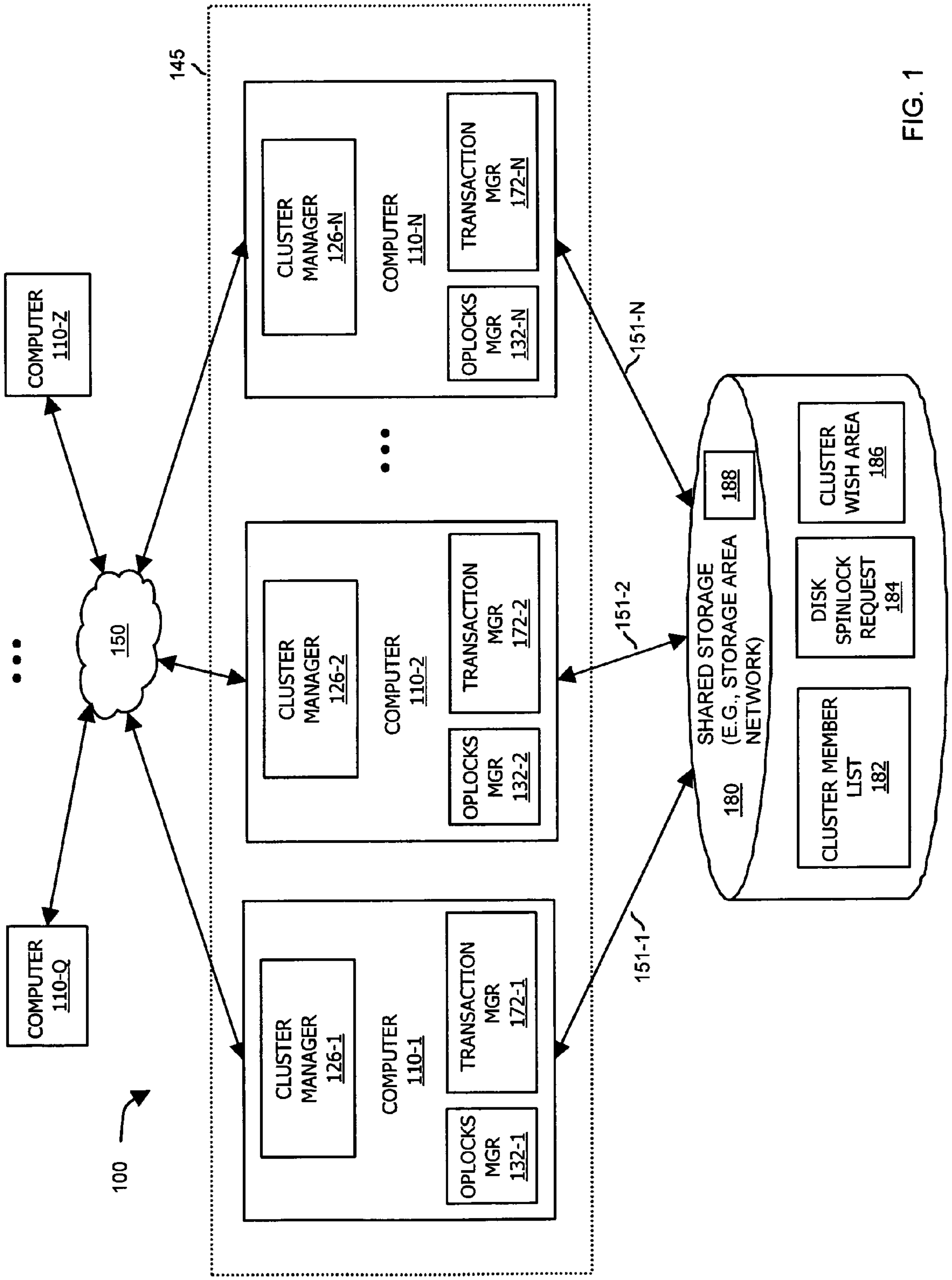
FIG. 1 is a block diagram of a shared storage system architecture in a computer according to an embodiment of the invention.

FIG. 1 illustrates a system 100 (e.g., network environment) suitable for explaining an operation of example embodiments of the invention. As shown, system 100 includes a network 150, links 151-1, 151-2, . . . , 151-N (e.g., links independent of network 150), cluster 145 including computers 110-1, 110-2, . . . , 110-N, (collectively, computers 110 or individually computer 110), and shared storage system 180. Each of the computers 110 in cluster 145 includes a respective cluster manager 126-1, 126-2, . . . , 126-N (e.g., a distributed software application), an oplocks manager 132-1, 132-2, . . . 132-N, a respective transaction manager 172-1, 172-2, . . . , 172-N, journal manager, etc. Functionality provided by the oplocks manager 132, transaction manager 172, and journal manager are discussed in related applications incorporated by reference.

In general, cluster manager 126 enables computers 110, in a distributed manner, to manage which computers 110 shall be maintained or included in a cluster 145. Shared storage system 180 includes regions accessible by computers 110 for storing information (e.g., member IDs, network addresses, etc.) in cluster member list 182, disk spin lock request area 184, cluster descriptor 188, and cluster wish area 186, all of which further support maintaining the cluster 145. Cluster member list 182 identifies a list of computers 110 included in the cluster 145. Disk spin lock request area 184 provides a region for computers 110 to read and write and obtain activation rights to perform certain functions. Cluster wish area 186 provides a region in shared storage 180 for computers that demand changes to the cluster 145 to post their requests to change the cluster 145 and wait for approval. The cluster descriptor 188 contains cluster ID information as well as cluster timing information. Each of these features as well as additional features will be further discussed later in this specification. In one embodiment, the shared storage 180 includes one or more mechanical mechanisms to access disk media (e.g. spinning disk storage media) for storing digital information.

In general, computers 110 (which form cluster 145) communicate over network 150 (e.g., a TCP/IP network) to coordinate accesses to a region such as a volume in the shared storage system 180. In one embodiment, each cluster 145 in system 100 can access or mount a common volume in the shared storage 180. Thus, multiple remotely located computers 110 with respect to the shared storage 180 can access the common volume.

Cluster managers 126 support functions such as i) forming an initial core membership of computers 110 in the cluster 145, ii) accepting and registering new computers 110 into the cluster 145, iii) notifying the rest of the computers in the cluster 145 of new members or a change in membership, iv) removing or deregistering computers 110 from the cluster 145, v) detecting and handling of member failures caused by various reasons like system crashes or network failures, vi) notifying the remaining members of the detected member failures, vii) preventing inclusion of computers 110 in cluster 145 that have no means of communications with all existing cluster members, etc.

The cluster manager functionality is not necessarily a specific machine (i.e., computer) per se. Instead, the cluster manager 126 is an application or system running on machines taking part in a cluster 145. For example, computers 110 in the cluster 145 share rights and responsibilities for performing cluster manager duties. One purpose of the cluster manager functionality is to maintain cluster consistency, which involves modifying the current cluster 145 to include membership of only the computers 110 associated with network 150 that are fully connected (e.g., such as those that can communicate) amongst each other. Knowing which computers 110 are in a given cluster 145 enables the computers to communicate and coordinate accesses to shared storage 180 without causing data corruption as a result of two computers accessing the same data in shared storage 180.

Operational Characteristics of Computers in a Cluster

When computer 110-1 desires access to a specific region or a volume in the shared storage system 180, computer 110-1 mounts the given volume and negotiate with other computers 110-2, . . . , 110-*n* for inclusion in the cluster 145 and access to shared storage system 180. Each computer 110 maintains a constantly updated cluster list (via the cluster manager 126) identifying computers 110 (and corresponding network address, etc.) listed as members of the cluster 145. If another computer 110 in the cluster 145 presently has access to the specific region, a newly requesting computer 110-1 waits until it negotiates permission for exclusive access to write to portions of a given volume. Oplocks manager 132 provides functionality to lock access rights so that a given computer 110 can modify contents of shared storage 180 without corruption by another computer 110 in cluster 145 accessing a same area of the volume. Unlike exclusive WRITE access rights, READ access rights need not be exclusive. In other words, multiple computers 110 may simultaneously have rights to READ from specific regions in shared storage system 180.

One method of ensuring exclusive access is to implement an OP-LOCK function (e.g., operation lock function in which one computer has exclusive or shared access) in which certain computers 110 in cluster 145 are locked out of accessing the specific storage region in shared storage system 180. Locked out computers 110 do not interfere with computer 110-1 by writing to locked out portions of shared storage 180 when a particular computer 110 in the cluster has exclusive access to the specific region (e.g., a volume) in the shared storage system 180. Note that at any given time, different computers 110 may negotiate permission to access different portions of shared storage system 180 at the same time. Thus, computer 110-1 may access a specific region in a volume while computer 110-2 has access to a different region of the same volume. In certain cases, the op-locks manager 132 distributed amongst computers 110 supports shared simultaneous access by multiple computers 110 in the cluster 145. As its name suggests, the cluster manager 126 supports management of the cluster via distribution of duties to its members. Duties of members in a cluster can change over time. More details of the op-locks manager 132 functions are discussed in the related applications incorporated by reference, however, as discussed, op-locks and cluster manager 126 are distributed functionality enabling computers 110 in cluster 145 to access shared storage 180.

In one embodiment, computers 110 reference locations or regions in the shared storage system 180 based on use of a unified address space utilized by the transaction manager 172. For example, locations or content in the shared storage system 180 are mapped to a 128-bit address space. Each of computers 110 utilize the same addresses in the unified address space to reference the same locations in shared storage space 180. Thus, computers 110, when negotiating for access to a region in shared storage system 180, utilize the same addresses in the unified address space to identify same storage regions.

After negotiating permission to access a specific region in shared storage system 180, computer 110-1 retrieves corresponding data from shared storage and stores the retrieved data in its cache. That is, computer 110-1 communicates over network 151 to shared storage system 180. User at computer 110-1 modifies the data stored in its cache. As computer 110-1 modifies the data in its cache, a respective journal system logs the corresponding operations (e.g., transactions) associated with the modifications. In one embodiment, a user modifies aspects of a file in a volume and journal system logs changes to metadata associated with the file. Eventually, computer 110-1 flushes the modified data in its cache back to the shared storage system 180. This involves writing the modified data in cache to the shared storage system 180 and clearing the cache for filling again.

In one embodiment, shared storage system 180 includes dedicated journal data regions for storing journal data associated with respective computers 110. For example, computer 110-1 (when appropriate) writes its journal data from journal system to journal data region shared storage 180.

Prior to flushing (or retrieving and storing a journal) modified data from a cache in computer 110-1 to shared storage system 180 for the above example, computer 110-1 writes associated transactions (e.g., journal data) logged in its journal system in computer 110-1 to journal data region in the shared storage 180. Thereafter, computer 110-1 proceeds to retrieve and thereafter write the modified contents (e.g., modified metadata) of cache to the proper locations in shared storage.

In the event that computer 110-1 crashes (e.g., becomes inoperative) during the process of writing modified data in cache to shared storage 180, the journal data written to the journal data region prior to the flush of the cache may be replayed by another non-crashed, healthy computer (e.g., computer 110-2, . . . computer **110-*n*) for recovery purposes. In other words, as a result of the crash, computer 110-1 may corrupt metadata associated with files in the shared storage system. Other computers 110-2, . . . , 110-*n* learn of the crash as a result of a communication timeout with the crashed computer 110-1. In response, the first computer such as computer 110-2 learning of the failure checks the journal data region associated with the crashed computer 110-1 to determine whether the journal needs to be replayed. If so, the healthy computer 110-2 replays the journal to recover metadata in shared storage system 180. Computers 110 may determine who is presently in the cluster 145 or who is a dead member of cluster 145 via cluster manager 126**.

One or more healthy computers (e.g., a non-failing computers) may detect a failure in a computer having access to the shared storage system 180. The failure can be detected as a result of at least one of the computers 110 in the cluster 145 failing to receive a heartbeat signal, which may be expected to be received from another computer 110 in the cluster 145. A heartbeat signal is an occasional communication from one computer to another computer 110 in a cluster 145 to indicate that the sending member is still alive and functioning. According to such an embodiment, computers 110 in a cluster 145 are programmed to communicate with other computers 110 in the cluster 145 by at least occasionally communicating with each other via a heartbeat signal. If no heartbeat signal is detected in a timeout period but is expected, a computer 110 may assume that another computer 110 in the cluster 145 has failed and that the failing computer 110 should be removed from the cluster 145. The computer detecting such a condition may send a message to the potentially failing computer 110 to initiate communications. If the potentially failing target computer 110 does not respond, it can be assumed that the target computer 110 has crashed or failed. An inquiring computer 110 may further check with other computers 110 in the cluster 145 to determine whether the other computers can communicate with the non-responding target computer. If the other computers 110 in the cluster also cannot communicate with the target computer 110, this corroborates the inquiring computer's suspicion that the target computer 110 in the cluster has crashed. Thus, techniques for detecting a crashed computer condition includes receiving a message from another non-failing computer that the computer experiences the failure, and/or attempting to communicate with the computer but failing to receive an acknowledgment message. One or more members of the cluster 145 may initiate removal of a non-responsive member. The cluster manager 126 at each computer 110 provides functionality for maintaining a list of members in a cluster 145.

The computers 110 in the cluster 145 may also monitor their own health. For example, if access to shared storage 180 are too slow or disappears, the machine recognizing this event stops communicating with the other members. One of the living machines then removes the dead member from the cluster, updates the cluster table in shared storage, notifies others of the dead member, and replays the journal of the dead member so that data in the shared storage 180 does not become corrupt.

Further Discussion of Cluster Manager Operation

As discussed, a cluster 145 includes a set of computers 110, which cooperate with each other to access shared storage 180. In one embodiment, a cluster 145 in system 110 is built around a common shared storage system 180 that provides input data to be processed by computers in the cluster 145. Data processed and generated by the computers 110 in the cluster 145 is generally read from and thereafter written back to shared storage 180. Cache in computer 110 provides local region to modify the contents retrieved from shared storage 180.

In one embodiment, the shared storage 180 is a Storage Area Network (SAN) accessible by computers 110 via links 151. Links 151 from the computers 110 to the shared storage 180 provide a wide channel (e.g., a channel having high bandwidth) capable of transferring (in either direction) a large amount of data. However, even though a link 151 (e.g., fiber channel) itself may be quite fast, the actual latency associated with accessing data in the shared storage 180 can be quite long due to, at least in part, the time it takes to access a disk in the shared storage 180 storing the data of interest.

In one embodiment, some or all computers 110 in the cluster 145 have full read/write access to portions of the shared storage 180. As discussed, computer members of the cluster 145 synchronize among themselves in order to read/write to overlapping regions of the shared storage 180. In certain cases, cluster member computers 110 exchange information to support further data processing. The exchange of information typically occurs over a secondary channel or communication link (e.g., network 150 such as the Internet, Intranet, LAN, WAN, etc.) that is designated for exchanging commands and for data synchronization between machines (e.g., computers in a cluster). According to one embodiment, the communication link such as network 150 for communicating between computers in a cluster 145 is a TCP connection over Ethernet. Bandwidth associated with the TCP connection may be quite limited. However, such connections typically have a relatively low latency.

In one embodiment, system 100 includes computers 110 that form multiple different clusters, each cluster having access to a corresponding volume in shared storage 180.

Figure 2:
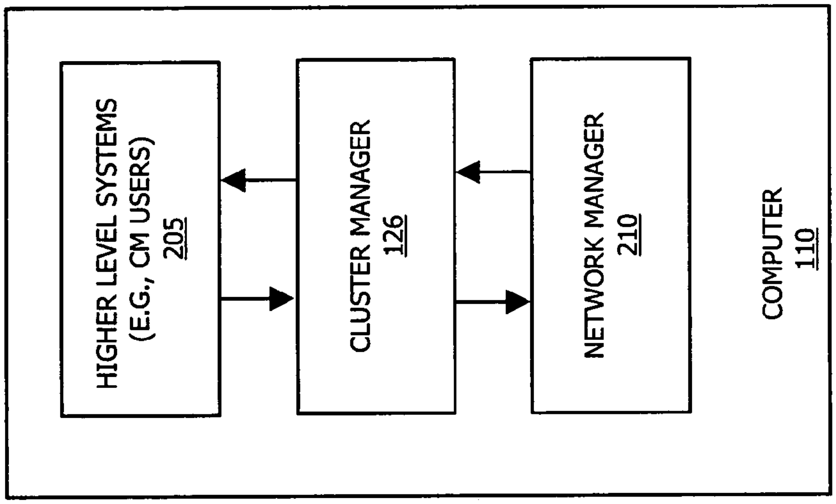
FIG. 2 is a block diagram of a cluster manager and related applications according to an embodiment of the invention

FIG. 2 is a block diagram illustrating a relative position of a cluster manager 126 with respect to other applications in computer 110 according to an embodiment of the invention. As shown, the cluster manager 126 is a relatively low level system in a cluster 145 and, more specifically, a computer 110.

The cluster manager 126 typically begins operating when it receives a command from higher-level systems (such as transaction manager, op-locks, etc. applications closer to the user) to join a cluster 145. Higher-level systems provide a storage device handle. The network manager 210 provides and manages TCP connections with other computers in the cluster 145. In general, the storage device handle and TCP connections are used cluster manager 126 to communicate.

Figure 13A:
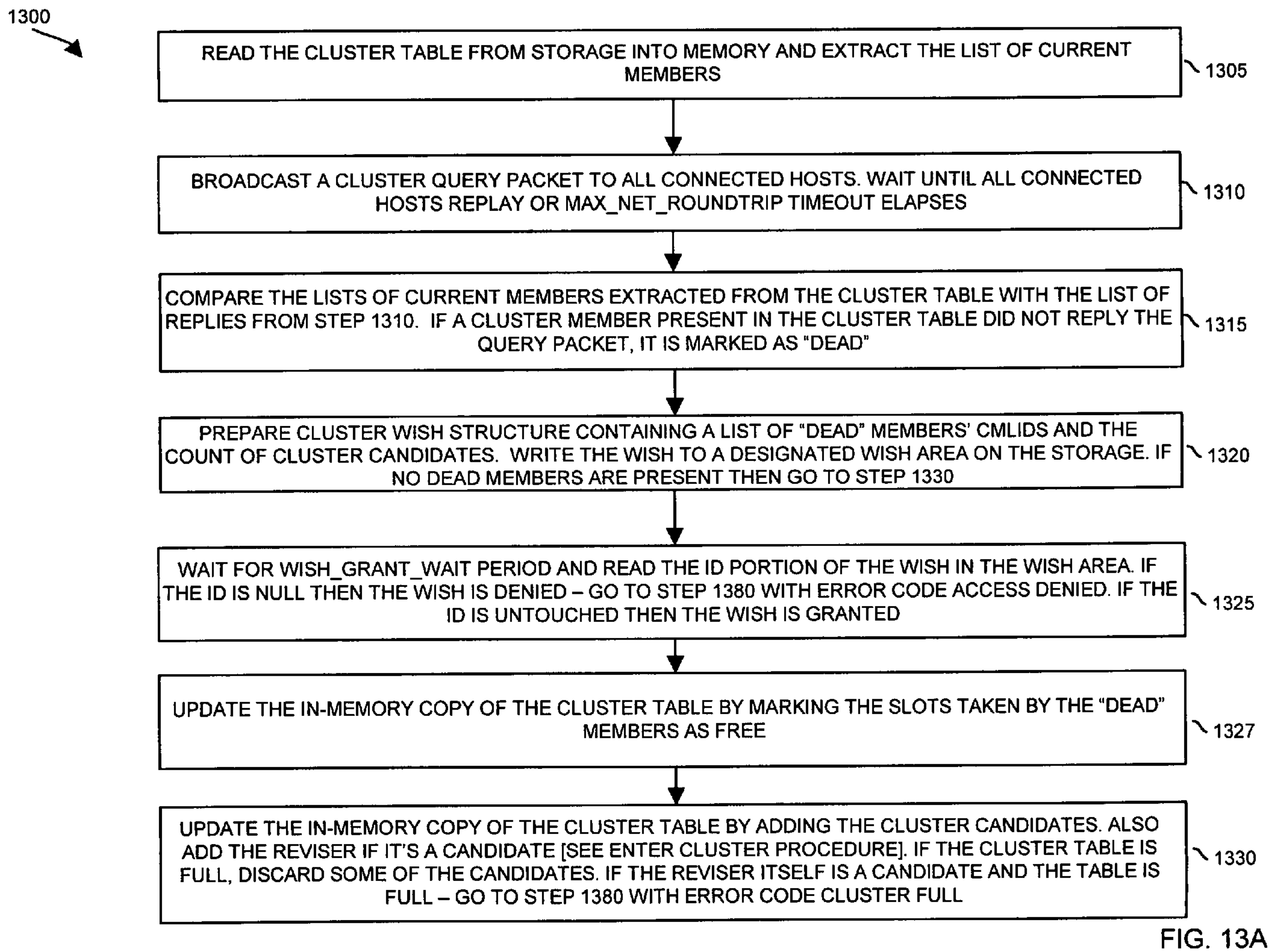
FIGS. 13A and 13B combine to form a flowchart illustrating a cluster revise routine according to an embodiment of the invention.
Figure 13B:
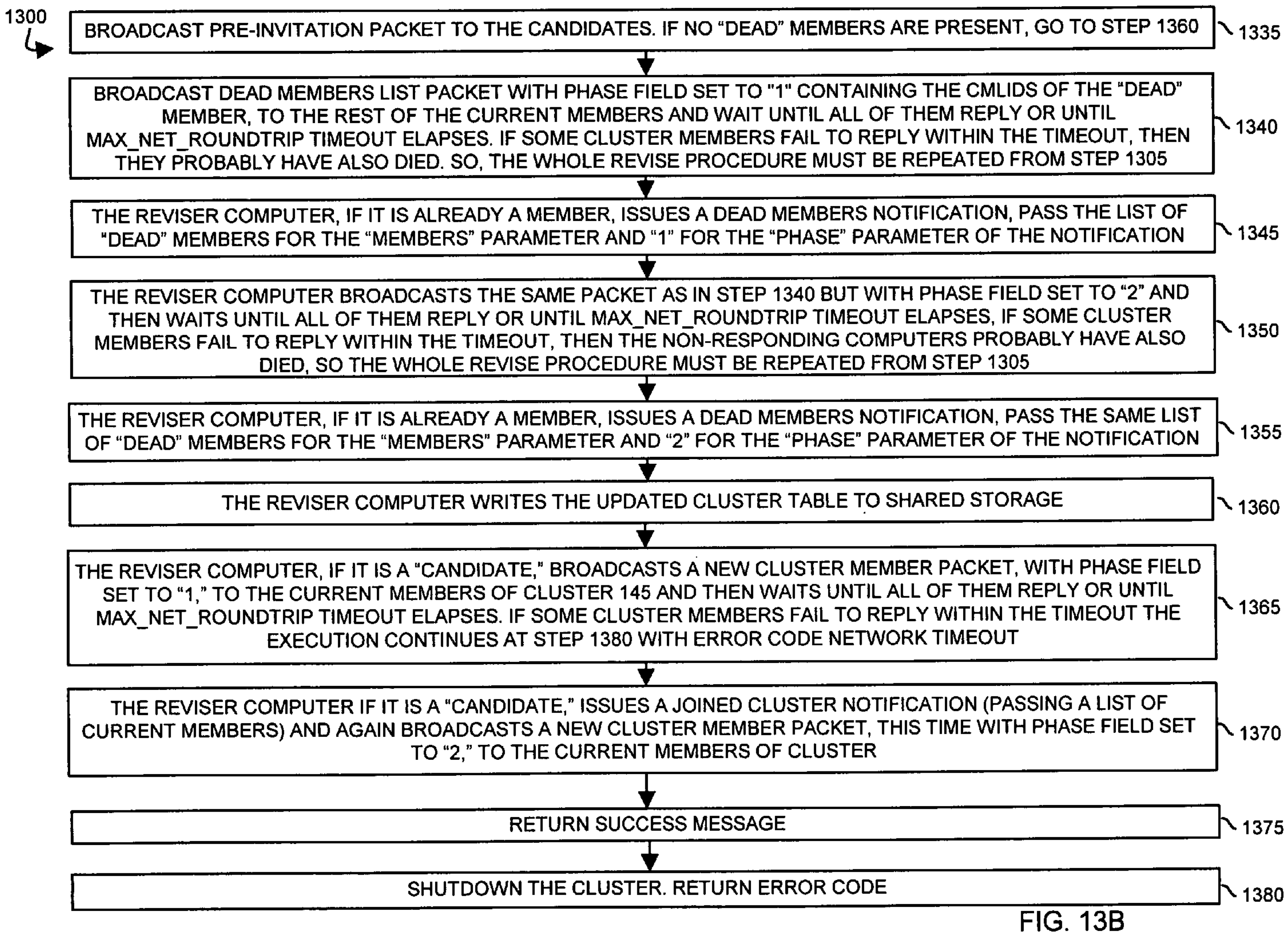
Figure 15:
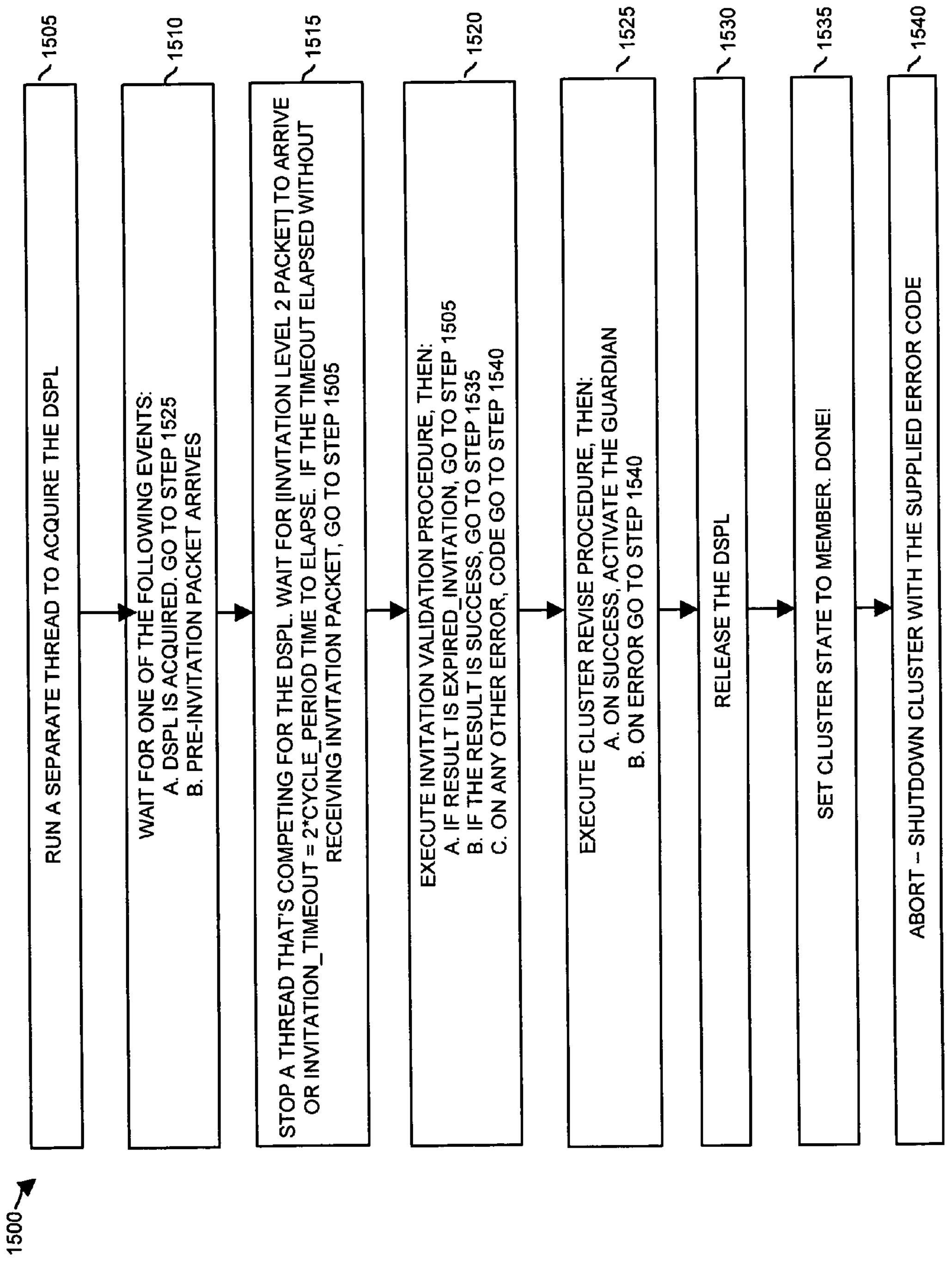
FIG. 15 is a flowchart illustrating a technique to enter a cluster according to an embodiment of the invention.

When the cluster manager 126 receives a "join cluster" command from higher-level systems 205, it executes the Enter Cluster Procedure as further illustrated in FIG. 15. During the enter cluster phase, a machine (i.e., a computer in system 100) is not yet a cluster member, but only a candidate. The candidate machine uses a Globally Unique IDentifier (GUID) to identify itself apart from other computers in system 100. Even though not a member, a machine candidate's first task is to check and ensure cluster consistency. This is one purpose why the Cluster Revise Procedure (as shown in FIGS. 13A and 13B) is associated with the entering phase. During this latter phase, the candidate also searches for other candidates in system 100 (not in the cluster 145) that wish to be included in a cluster having access to the shared storage 180.

Figure 3:
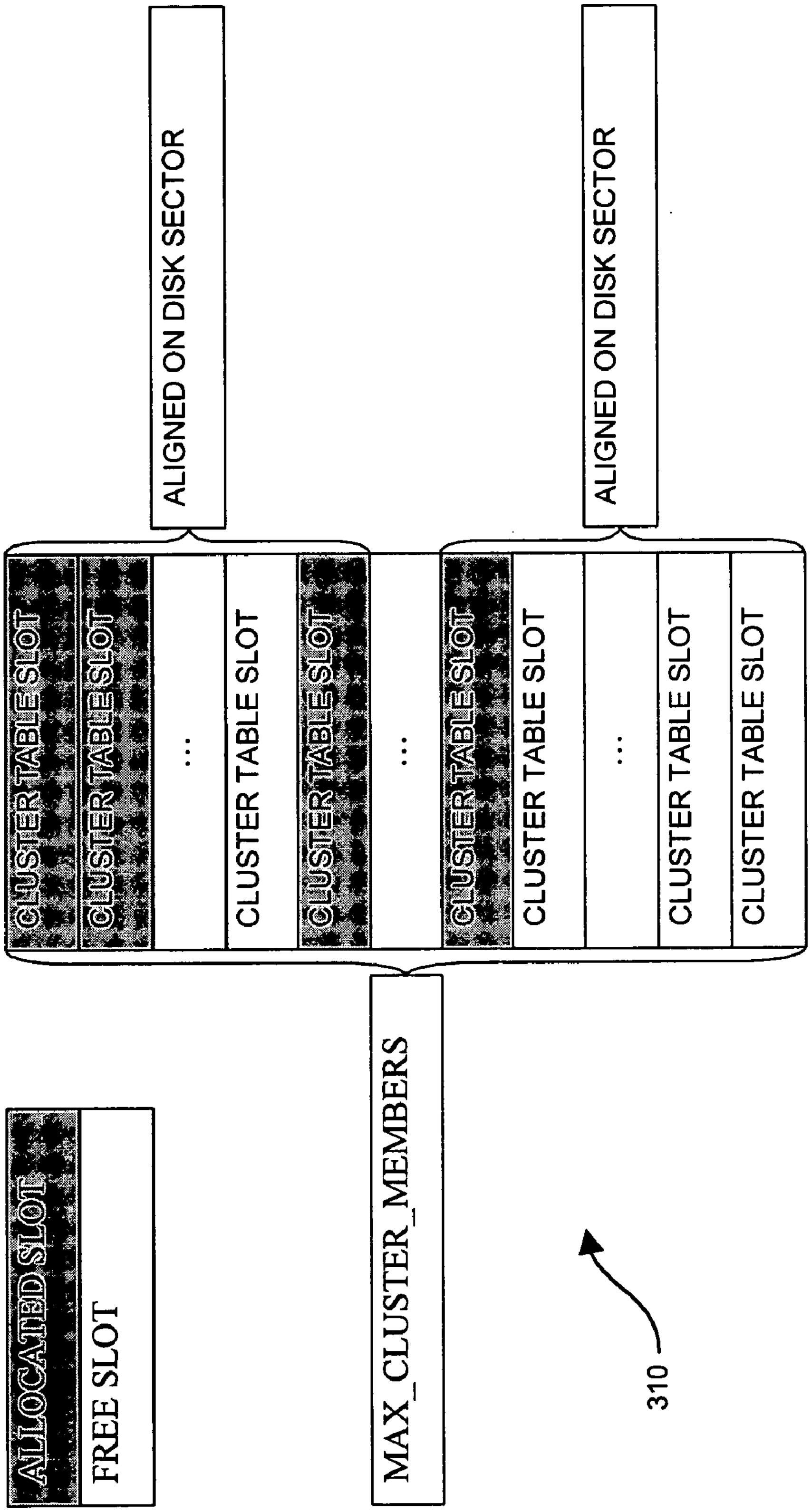
FIG. 3 is a diagram of a cluster table in shared storage according to an embodiment of the invention.

The candidate computer wishing to join a cluster allocates slots in the cluster table (as shown in FIG. 3) for itself and the other possible candidates. In one embodiment, the cluster table 310 is located in shared storage 180. Allocating a slot in the cluster table 310 is done by increasing the generation field of the slot 320 and marking it as occupied. The generation field coupled with the index of the corresponding slot form a Cluster Member Local IDentifier (CMLID). A CMLID identifies a machine to be added to a cluster 145. After becoming a cluster member, the CMLID is used by higher system levels such as Oplock to identify the computer machine within the cluster. Since CMLID is shorter than GUID, the network communication is more efficient.

If the enter cluster procedure (FIG. 15) is successful, a candidate becomes a member of the cluster 145. By activating the cluster guardian in cluster manager 126, the new member is ready to fulfill its duties in maintaining cluster consistency along with the other members. The Guardian provides status information over the network to notify other members of the cluster 145 of its health. In the event of a failing guardian, the members of the cluster 145 can access shared storage 180 to retrieve status information about the cluster 145.

As an established member, cluster manager 126 also responds to notifications by the network manager 210, which supports communications and can detect broken connections in network 150. Whenever a problem (e.g., a network failure) is detected, cluster manager 126 schedules a revision to the cluster. This involves executing Cluster Revise Procedure (FIG. 13) while the Disk Spinlock is held. In general, Disk Spinlock is a privilege held by only one member in a cluster 145 at a time so that there are reduced conflicts among members to perform certain tasks. The acquirer of disk spin lock may perform certain privileged functions. The member can restore cluster 145 consistency via the cluster revise procedure, while acquiring disk spinlock guarantees that only one computer 110 runs the revision process at a time in the cluster 145.

Figure 16:
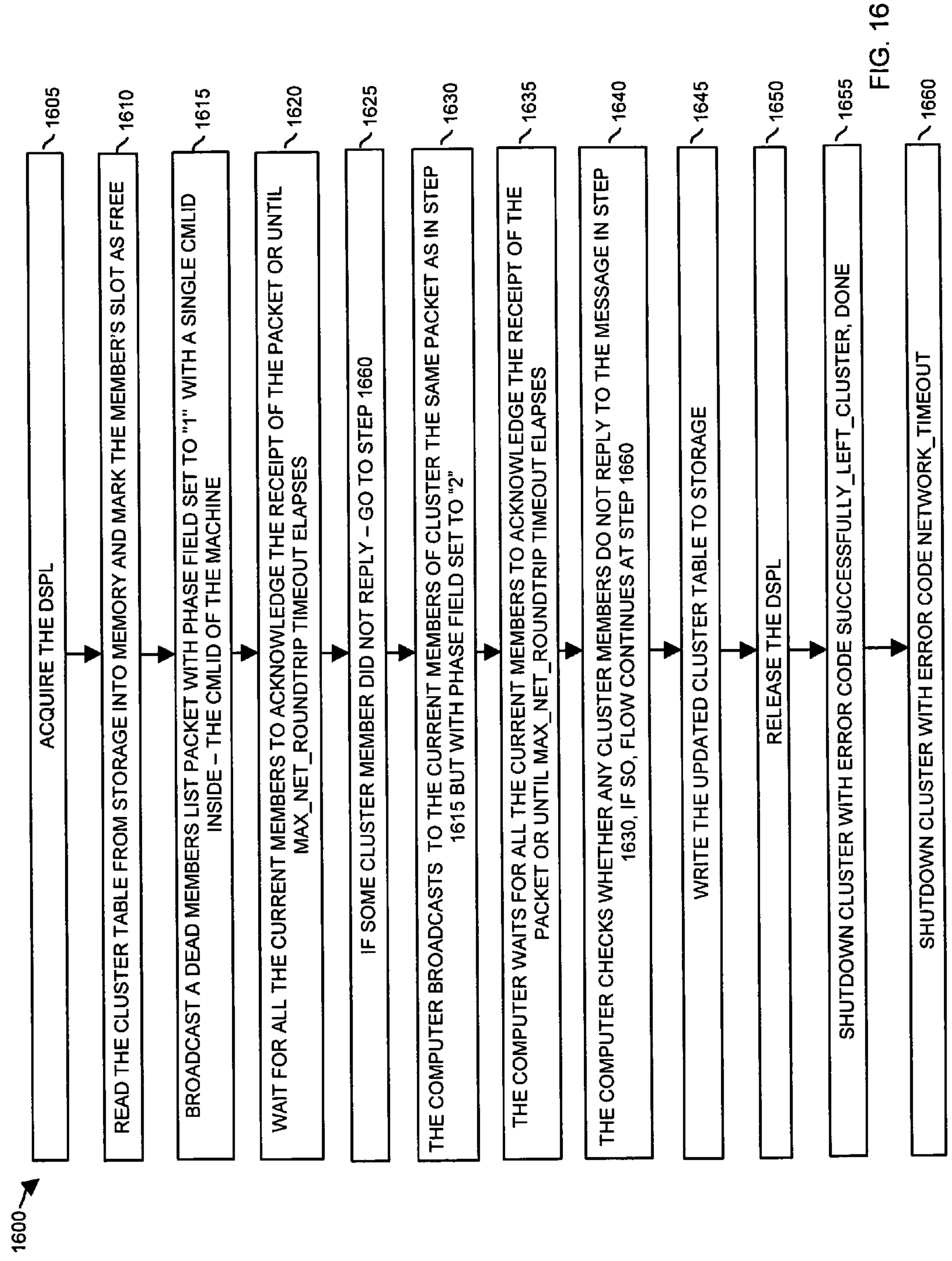
FIG. 16 is a flowchart illustrating a technique to leave a cluster according to an embodiment of the invention.

Finally, when upper level systems 205 no longer need cluster membership they issue a "leave cluster" command and the respective cluster manger 126 signs off the cluster 126 by executing the Leave Cluster Procedure as shown in FIG. 16. Further details of the above routines will be discussed later in this specification.

Cluster Emergency

One purpose of the cluster manager 126 is to generate a Cluster Emergency State (CES) in the event of a failure. CES can be caused by failures such as:

Disk Spinlock Failures.

Guardian Failures.

Connection failures—if a cluster member loses connection with the rest of the cluster 145, it could be forced to quit the cluster.

Upper level software system failures.

Figure 17:
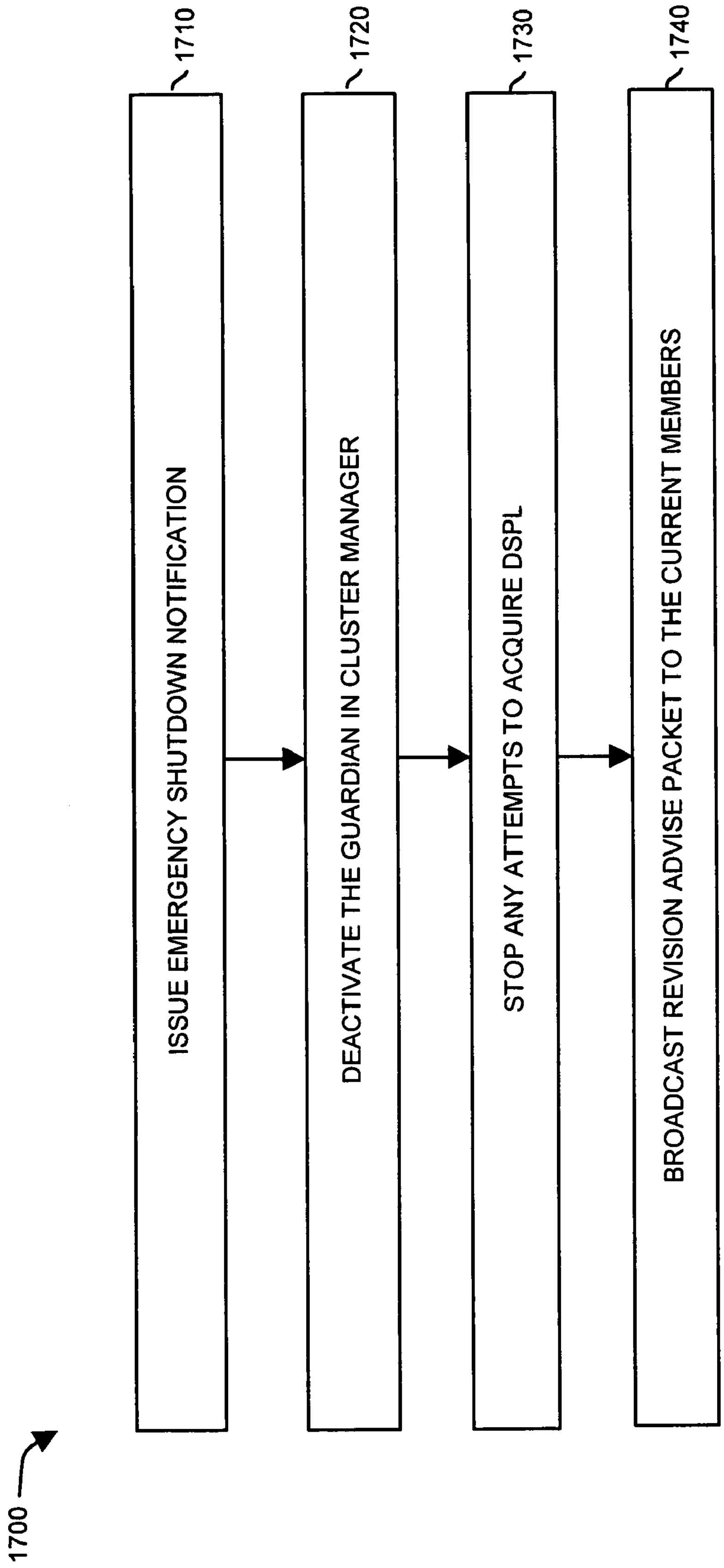
FIG. 17 is a flowchart illustrating a technique to shut down a cluster according to an embodiment of the invention.

A CES is declared when a machine detects an error that it is unable to recover from. In case of a CES, one strategy to avoid corruption of data in the shared storage 180 is to immediately seize all disk operations to the shared storage 180. A respective cluster manager 126 itself detecting the CES would immediately deactivate it from being the Guardian and stops any attempts to obtain the Disk Spinlock if there are such in attempts currently in progress. The act of declaring a CES is called Cluster Shutdown (FIG. 17).

Network Manager Notifications

The network manager 210 provides the following notifications to the cluster manager 126.

| Name | Parameters | Description |
|---|---|---|
| New Connection(connection, phase) | connection Connection structure. phase Number. Value is either 1 or 2. | A new connection is made. |

The network manager 210 guarantees for any new connection that the New Connection notifications are issued in an ordered manner with respect to the phase parameter. For example, the notification for a particular connection with the phase parameter set to "2" will be issued only after the New Connection notification for that connection has been issued with the phase parameter set to "1".

The network manager 210 also guarantees for any new connection the New Connection notification, with phase parameter set to "2", will not be issued until the network manager 210 on the other machine has issued New Connection notification, with phase parameter set to "1," for the corresponding connection.

Figure 18:
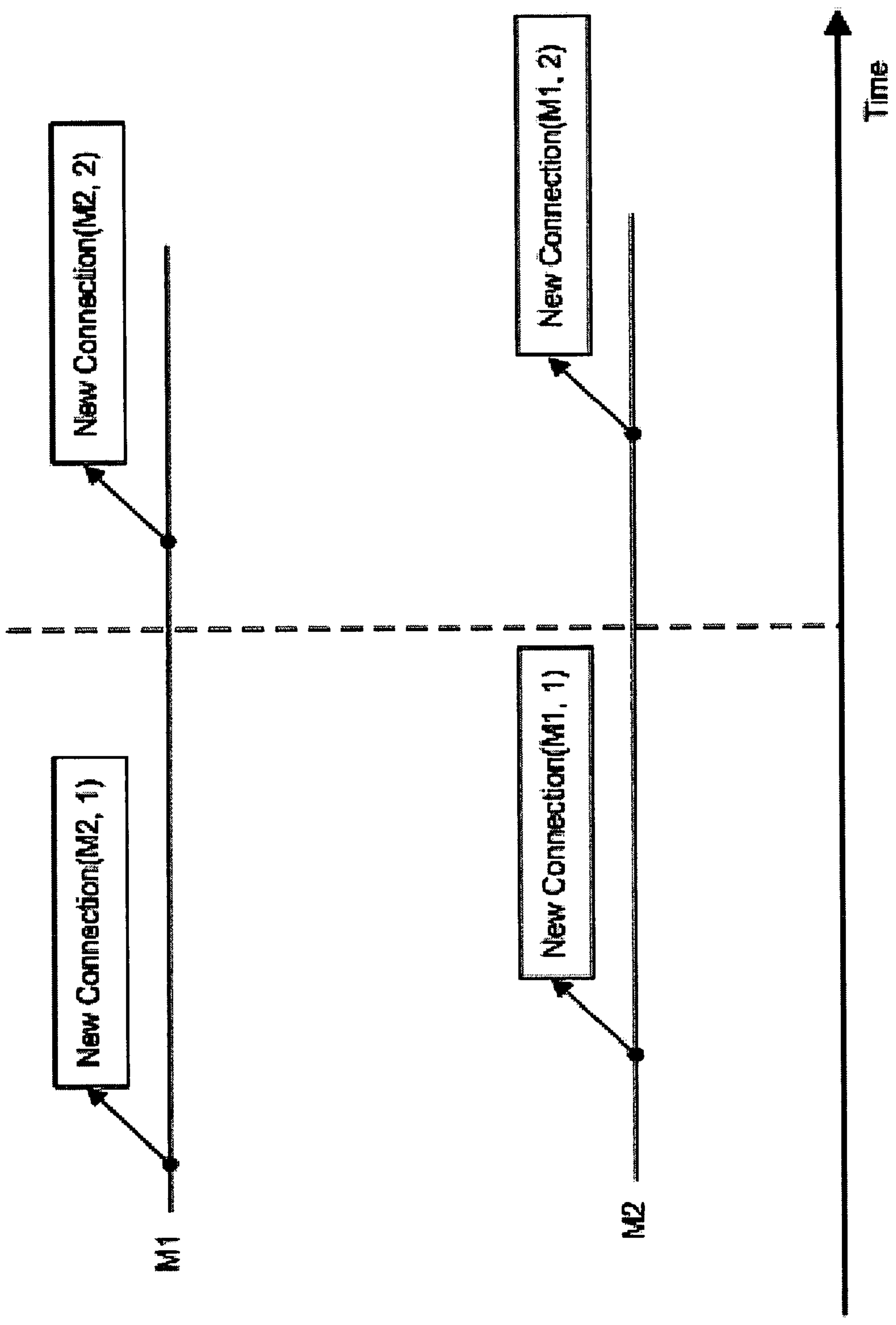
FIG. 18 is a diagram illustrating the time relations of issuing New Connection notification.

FIG. 18 illustrates an example of two computers M1 and M2 connecting to each other. For example, computer M1 is the initiator of the connection. Upon successfully initiating the connection the network manager 210 on M1 constructs a Connection structure and issues a New Connection notification passing this structure for the "connection" parameter and the value "1" for the "phase" parameter. When computer M2 encounters the new connection its network manager 210 also constructs a Connection structure and issues a New Connection notification passing the structure for the "connection" parameter and the value "1" for the "phase" parameter. Then network manager 210 running on M2 sends an acknowledgement packet to computer M1 over the newly formed connection. When computer M1 receives the acknowledgement its network manager 210 issues a New Connection notification with the previously constructed Connection structure, but with phase parameter set to "2". Computer M1 then replies to the acknowledgement packet received from computer M2. Upon receiving the reply network manager 210 on M2 issues a New Connection notification with the previously constructed Connection structure, but with phase parameter set to Cluster Manager Notifications Throughout various work stages, the cluster manager 126 constantly notifies the upper level systems 205 in a corresponding computer 110 of different type of events associated with the cluster 145. The following notifications are provided:

| Name | Parameters | Description |
|---|---|---|
| Joined Cluster(members) | members Array of Cluster Member structures. | Entered cluster. The array contains the existing cluster members. This list might be empty if there are currently no other machines in the cluster. |
| New Member(member, phase) | member Cluster Member structure. phase Number. Value is either 1 or 2. | New members have joined the cluster. |

-continued

| Name | Parameters | Description |
|---|---|---|
| DeadMembers(members, phase) | members Array of CMLIDs. phase Number. Value is either 1 or 2. | Some cluster members left the cluster in response to emergency or crash. |
| Reconnected(member, phase) | member Cluster Member structure. phase Number. Value is either 1 or 2. | The connections of the machine with another cluster member have been temporarily down but are now recovered. The connection field of the Cluster Member structure contains the new connections to be used. |
| Reconnected Other | None | Some connections between the other cluster members have been broken and are now restored. |
| Cluster Emergency Shutdown (CES) | Error Code | The cluster manager is in an emergency state and all activities should be terminated as soon as possible. Detection of an error is the reason for declaring the CES. |

Similar to the notifications issued by the network manager 210, all of the above notifications that take a phase parameter are also time-ordered in respect of that parameter.

This bi-phase notification mechanism is implemented through additional communication over the network 150. Details concerning that communication for each notification are presented together with the cluster algorithms below.

Bi-phase notification mechanism is important to higher levels that respond to cluster notifications (e.g. Oplock Manager) to prevent racing conditions. The following example illustrates a racing condition that could occur if notifications were mono-phase.

EXAMPLE

A computer M3 is entering a cluster that already has two members—computers M1 and M2. Computer M3 broadcasts a packet that will signal the cluster managers on computers M1 and M2 to issue New Member notification regarding M1. It is possible that computer M1 receives the notification packet and issue the New Member notification some time before computer M2 receives the broadcast notification packet. If an upper level subsystem (e.g. Oplock Manager) on M1, upon receiving the notification, sends a packet to M2, the packet regarding the new computer M3, it is possible that the upper level subsystem's packet reaches M2 before the notification packet initially broadcast by M3. The result is that an upper level subsystem on M2 could receive a packet from the same level subsystem on M1 that regards a computer M3 that in turn is still unknown to M2.

In addition to phase order, different types of notifications may also impose a particular ordering in time.

These are as follows:

i. Joined Cluster notification on a computer entering a cluster 145 will be issued by cluster manager 126 only after the cluster managers of the current cluster members issue a New Member notification, with phase parameter set to "1", for the corresponding new member.

ii. New Member notification, with phase parameter set to "2", for a new computer that has entered the cluster 145 will be issued by the cluster managers of the current cluster members only after the cluster manager 126 of the new computer has issued Joined Cluster notification with the list of current cluster members.

Figure 19:
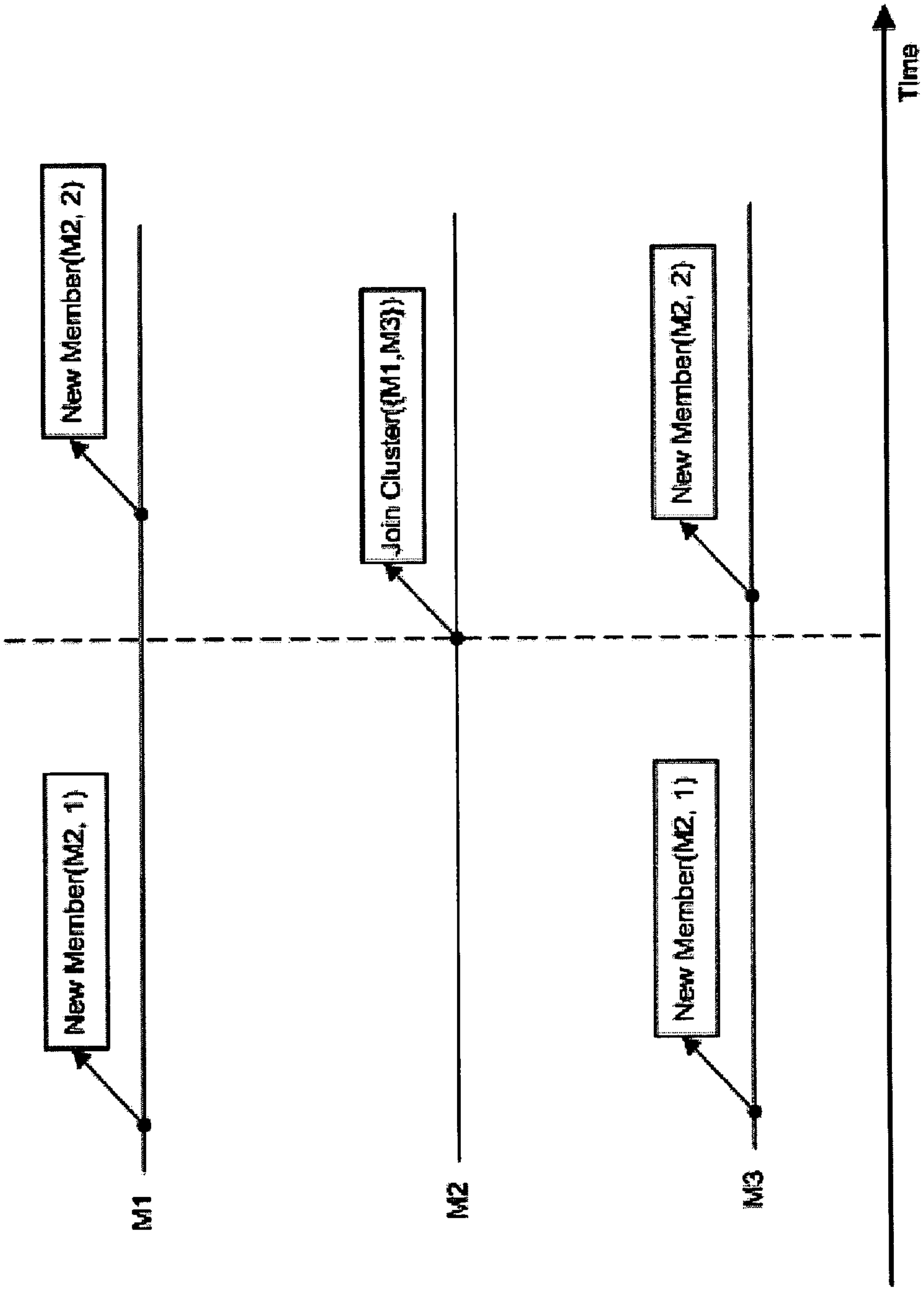
FIG. 19 is a diagram illustrating the time relations of issuing Joined Cluster and New Members notifications.

FIG. 19 is a diagram illustrating the time relations of issuing Joined Cluster and New Members notifications. Computers M1 and M3 are already members of the cluster 145. Computer M2 is entering the cluster. The following events occur:

1. The cluster managers on computers M1 and M3 issue New Member notification, with phase parameter set to "1" and with member parameter set to a Cluster Member structure describing computer M2. The relative time order of issuing the two notifications on computer M1 and M2 is arbitrary.
2. The cluster manager 126 on computer M2 issues Joined Cluster passing a list of Cluster Member structures describing computers M1 and M3.
3. The cluster managers on computers M1 and M3 issue New Member notification, with phase parameter set to "2" and with member parameter set to a Cluster Member structure describing computer M2. The relative time order of issuing the two notifications on computer M1 and M2 is arbitrary.

The dashed line on the diagram represents the moment in time when step 2 is executed.

Cluster Manager and Synchronization Using Shared Storage

Since a TCP connection is used in one embodiment to provide data synchronization between computers 110 in cluster 145, cluster members have previously established connections with each other. Insufficient connection amongst computers 110 in cluster 145 via the TCP connection may result in lack of synchronization and, thus, data corruption in shared storage 180. Therefore, one functional aspect of the cluster manager 126 is to prevent machines (i.e., computers) with insufficient connection status from becoming cluster members. Another functional aspect of the cluster manager 126 is to force out of the cluster machines that have lost connections with the rest of the members in the cluster 145.

A TCP connection over network 150 may not by itself be a sufficient existing link to provide synchronization for its internal structures. Thus, the cluster manager 126 cannot rely solely on use of a TCP connection over network 150 for preventing computers in system 100 from entering the cluster 145 or forcing them to leave the cluster. This is because TCP connection might be missing in the first place. To resolve this potential issue, according to one embodiment, the cluster manager 126 uses the shared storage 180 to support synchronization.

The cluster manager 126 relies on a feature of the shared storage 180 such as atomicity of per-sector operations. A sector is the smallest unit of operation for a storage device in the shared storage. The sector is usually 512 bytes long but may be longer or shorter depending on the application.

According to one embodiment, operations over sectors are atomic. That is, a sector cannot be partially read or written to. In addition, operations of different machines over a single sector cannot run simultaneously because the device performs internal ordering of operations based on built-in logic.

The following operation sequences are the building blocks for cluster manager synchronization algorithms based on use of the shared storage 180:

1. Periodic monitor
a) Read sector.
b) Take some action based on the read data.
c) Sleep-wait for some fixed period and go to a).
2. Set, test and check
a) Write to a sector in shared storage.
b) Sleep-wait for some fixed period.
c) Read the same sector and take some action based on the sector contents.
3. Periodic Update
a) Update buffer (e.g., cache) in a corresponding computer.
b) Write contents of buffer to sector.
c) Sleep-wait for some fixed period and go to a).

Note that the time required for a sector operation cannot always be predicted and the shared storage 180 may not provide any information concerning the sector operation. For example, a computer machine (M1) executes operation sequence 2 above. The read operation could be delayed, allowing enough time for another machine (M2) to perform the whole sequence on the same sector in the meantime. Since sector operations are atomic, it is possible that the M1's read operation returns the sector contents as they were before M2's modification. Thus, in one embodiment, the cluster manager 126 relies on accurate system time measurement. The time associated with each sector operation is measured. If the time exceeds a certain threshold value, the operation is considered unsuccessful. The same rule is applied to each cycle in the periodic operations.

A cycle has a fixed amount of time to complete and, if it fails to complete within a particular timeframe, the periodic operation is aborted.

Cluster Timings

The following values are used as base to determine sleep-wait times, abort-timeouts and periods for periodic operations within a cluster 145. They are common for each computer 110 in a cluster 145.

| | |
|---|---|
| MAX DISK IO | Maximum expected time for a sector operation. Since all periodic sequences involve sector operations, this value can also become base for cycle periods if it's bigger than PERIOD_BASE. |
| PERIOD_BASE | Base for cycle periods but only if it's bigger than MAX_DISK_IO. |
| MAX_NET_ROUNDTRIP | Maximum expected time for a TCP packet to travel from one machine to another and back again. |
| MAX_SLEEP_DELAY | Maximum expected delay of a System Sleep call. This value indicates the expected responsiveness of the machines in the cluster. |

The values are configurable and the proper values to be used in an application depend on the shared storage 180, the network 150 and the hardware configuration of the computers in the cluster 145. Increasing any of these values will lead to a more stable function of the cluster 145 as a whole. That's because operations depending on this value will have more time available to complete and are less likely to be aborted because they've run out of time. The drawback is that operation sequences become slower and this might be unacceptable. Decreasing the values of the above parameters would speed up operation sequences, but might increase operation abort rate and cause whole blocks of operations to be repeated.

Cluster timing derivatives:

| | |
|---|---|
| NET_TALK = MAX_NET_ROUNDTRIP + MAX_SLEEP_DELAY | This is a typical time to wait for replies after broadcasting one or more packets. |
| CYCLE_PERIOD = MAX(PERIOD_BASE,MAX_DISK_IO) | Period for cyclic operations. |

Disk Spinlock

As discussed, Disk Spinlock (DSPL) provides a mechanism for acquiring cluster-wide exclusive ownership over some shared resource. In one embodiment, Disk Spinlock involves use of a single sector (e.g., designated location) of the shared storage 180 to support this function. Computers 110 in system 100 compete for ownership by writing to the single sector based on execution of the algorithm below.

In one embodiment, the computers have different associated "strengths" based on their GUIDs. In general, the strongest machine (e.g., a computer with the highest gravity factor) competing for the Disk Spinlock will acquire it unless some algorithm step fails or is aborted because of a timeout.

Figure 5A:
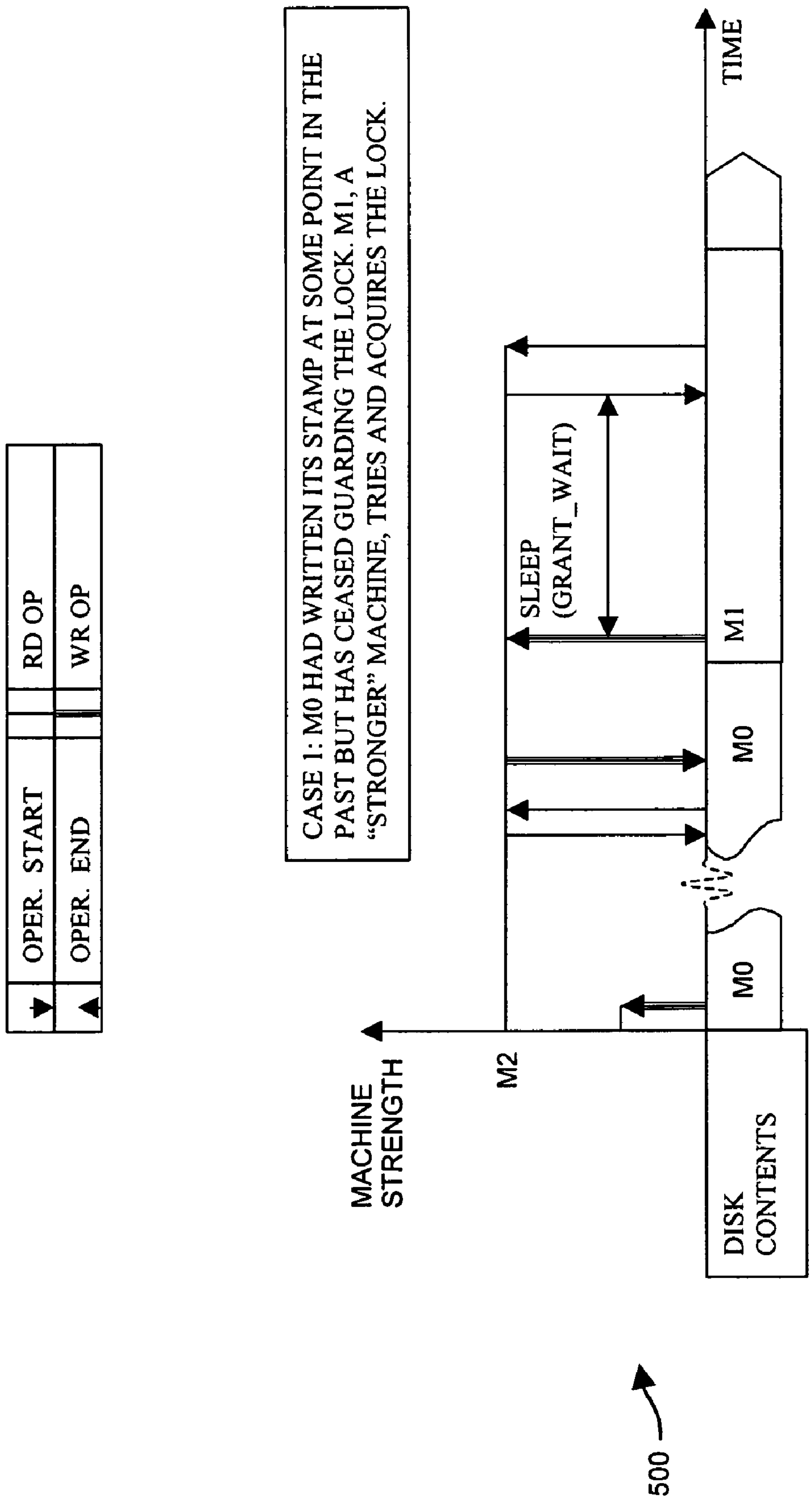
FIGS. 5A, 5B, and 5C are diagrams illustrating acquisition of disk spinlock (e.g., exclusive rights or privileges) according to an embodiment of the invention.
Figure 5B:
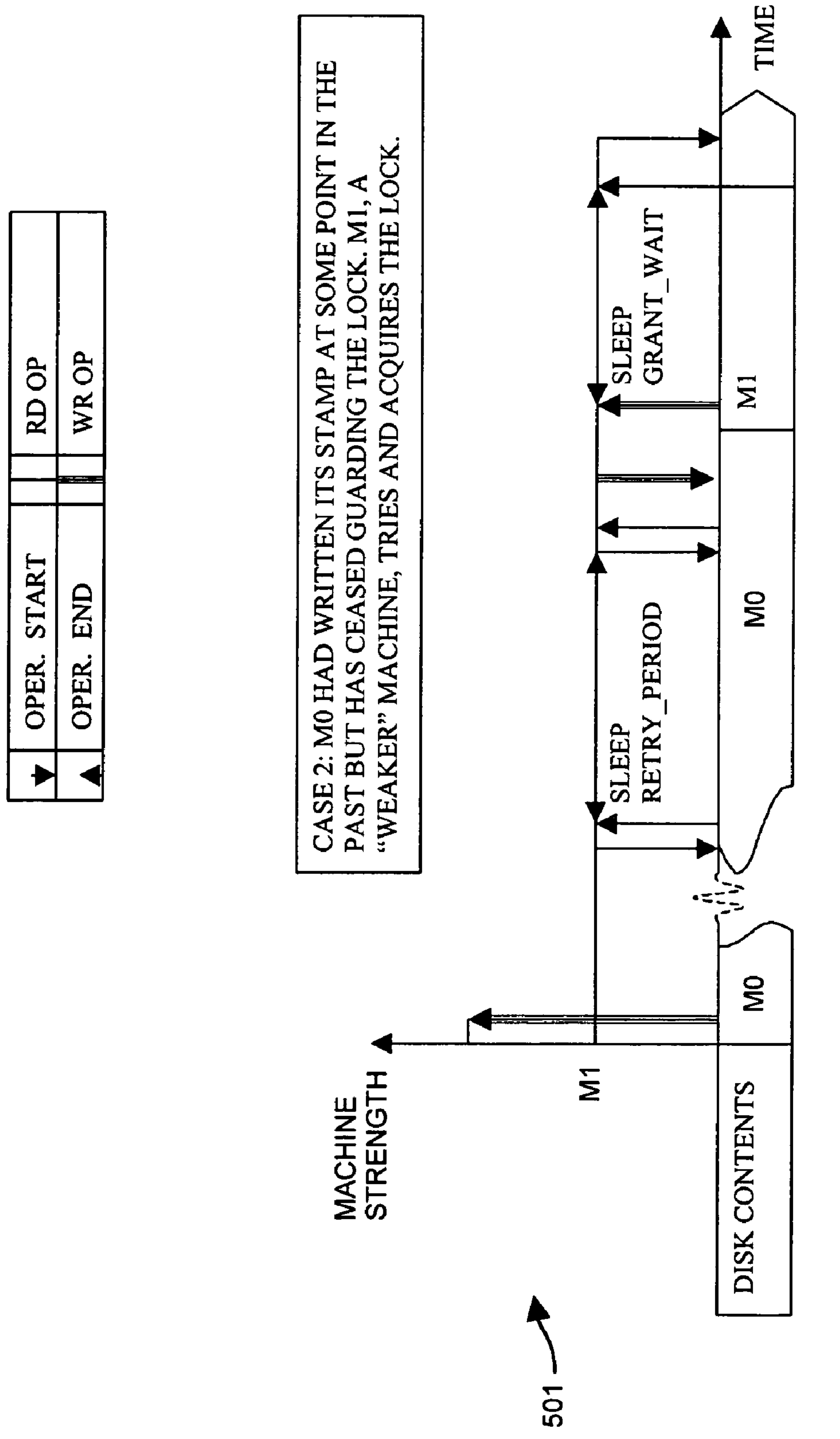
Figure 5C:
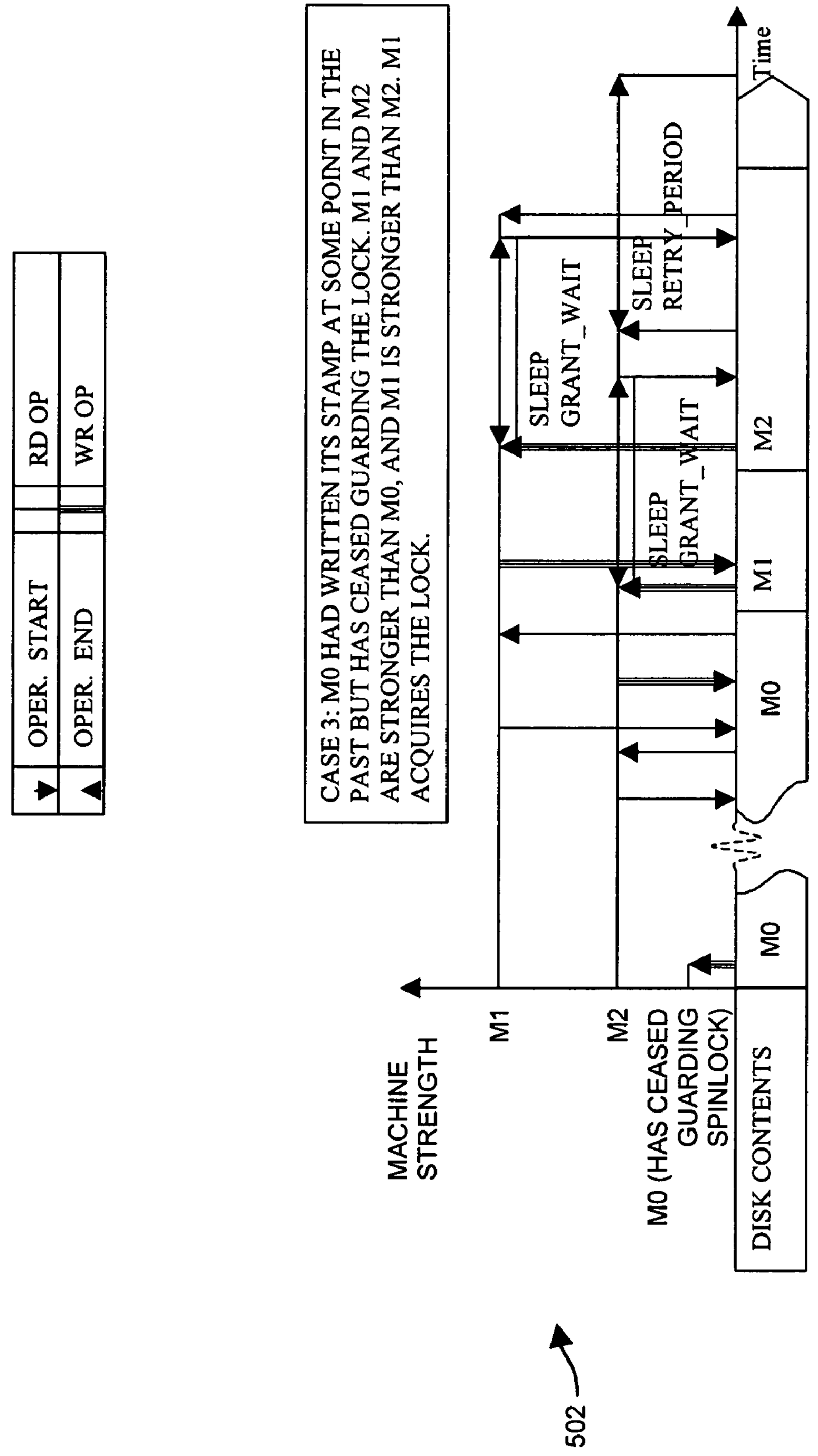

Different situations may occur while competing for the DSPL, but some common cases are shown in FIGS. 5A, 5B, and 5C.

FIG. 5A is a timing diagram 500 illustrating acquisition of DSPL by a stronger machine in system 100 according to an embodiment of the invention.

FIG. 5B is a timing diagram 501 illustrating acquisition of DSPL by a weaker machine in system 100 according to an embodiment of the invention.

FIG. 5C is a timing diagram 502 illustrating acquisition of DSPL by a stronger machine among multiple machines competing for DSPL according to an embodiment of the invention.

A strongest machine will typically acquire the DSPL unless, of course, some operation fails or runs out of time.

To obtain Disk Spinlock, the computers 110 run the following spinlock algorithm:

```
  function system_timer acquire_spinlock
(GUID my_machine_guid, disk_device disk)
  {
    host_stamp my_stamp, stamp, previous_stamp;
    my_stamp.id = my_machine_guid;
    previous_stamp.id =NULL_GUID;
  system_timer timer;
  repeat
  {
    disk.read_sector(DISK_SPINLOCK_SECTOR_OFFSET, stamp);
    if(stamp.id < my_machine_guid or stamp == previous_stamp)
    {
      my_stamp.time_stamp = system.get_current_time( );
      disk.write_sector(DISK_SPINLOCK_SECTOR_OFFSET,
      my_stamp);
      system.sleep_wait(GRANT_WAIT_TIME);
      timer.reset( );
      disk.read_sector(DISK_SPINLOCK_SECTOR_OFFSET,
      stamp);
      if(stamp == my_stamp)
      end repeat;
    }
    if(timer.get_elapsed_time( ) > CYCLE_PERIOD)
      CM.shutdown_cluster(STATUS_TIMEOUT);
  system.sleep_wait(RETRY_PERIOD);
    previous_stamp = stamp;
  }
  return timer;
}
```

The time values in the above code are as follows:

GRANT_WAIT_TIME = RETRY_PERIOD = 2*CYCLE_PERIOD +MAX_SLEEP_DELAY

Immediately after acquiring the DSPL, the owner of DSPL in the cluster 145 must begin guarding (e.g., overwriting data to the designated location so that another computer cannot take DSPL away) it by executing the following procedure:

```
  function void guard_spinlock(system_timer period_timer, host_stamp
my_stamp disk_device disk)
  {
    system_timer elapsed_time_measure;
    elapsed_time_measure.reset( );
    while(not must_release)
    {
      my_stamp.time_stamp = system.get_current_time( );
      disk.write_sector(DISK_SPINLOCK_SECTOR_OFFSET,
      my_stamp);
      if(period_timer.get_elapsed_time( ) >
      (CYCLE_PERIOD+MAX_SLEEP_DELAY))
        CM.shutdown_cluster(STATUS_TIMEOUT);
      period_timer.reset( );
      time elapsed_time =
      elapsed_time_measure.get_elapsed_time( );
      time time_to_sleep = CYCLE_PERIOD − elapsed_time;
      if(elapsed_time < MAX_DISK_IO and
      time_to_sleep > MIN_SYSTEM_SLEEP_SLICE)
      {
        system.sleep_wait(time_to_sleep);
      }
      elapsed_time_measure.reset( );
    }
  }
```

In the above code, MIN_SYSTEM_SLEEP_SLICE is the minimal value that can be passed to the sleep_wait system function. Must_release is a boolean that is set to true by the cluster manager 126 when the DSPL has to be released.

These time values guarantee that when a machine is already guarding the DSPL, an even "stronger" computer 110 in system 100 cannot acquire Disk Spinlock. That's because GRANT_WAIT_TIME gives enough time to a computer 110 guarding the lock to complete at least one full cycle, thus, enabling the computer 110 owning disk spinlock to overwrite any potentially stronger machines' stamp (unique identifier associated with the machine) trying to obtain Disk Spinlock.

Interaction Between Cluster Manager and Network Manager

Cluster manager 126 handles notifications issued by the network manager 210 to update the network connections for the current cluster members. Whenever network manager 210 issues New Connection notification cluster manager 126 checks if the new connection ID matches the connection ID of any of the members listed in Cluster Manager.current_members list. If so cluster manager 126 updates the connection of the corresponding member and issues a Reconnected Member notification passing the updated Cluster Member structure for the "member" parameter and same phase received from the New Connection notification. In addition, if the phase equals "2", Cluster manager 126 sends a Reconnected Other Packet to the rest of the cluster members. This in turn leads to corresponding cluster managers on the target computers issuing a Reconnected Other notification.

Figure 20:
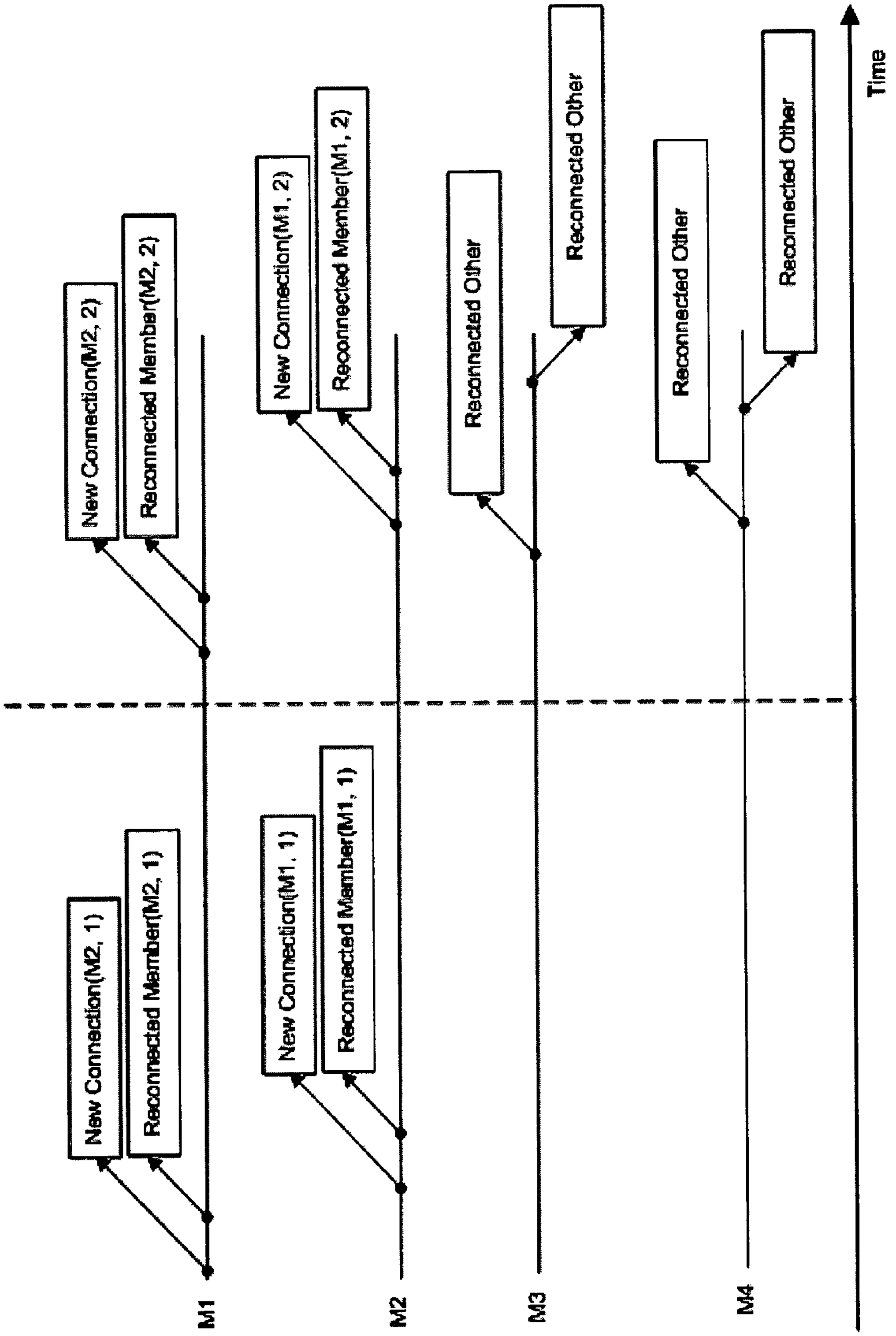
FIG. 20 is a diagram illustrating t the time relations of issuing Reconnected Member and Reconnected Other notifications.
Figure 21:
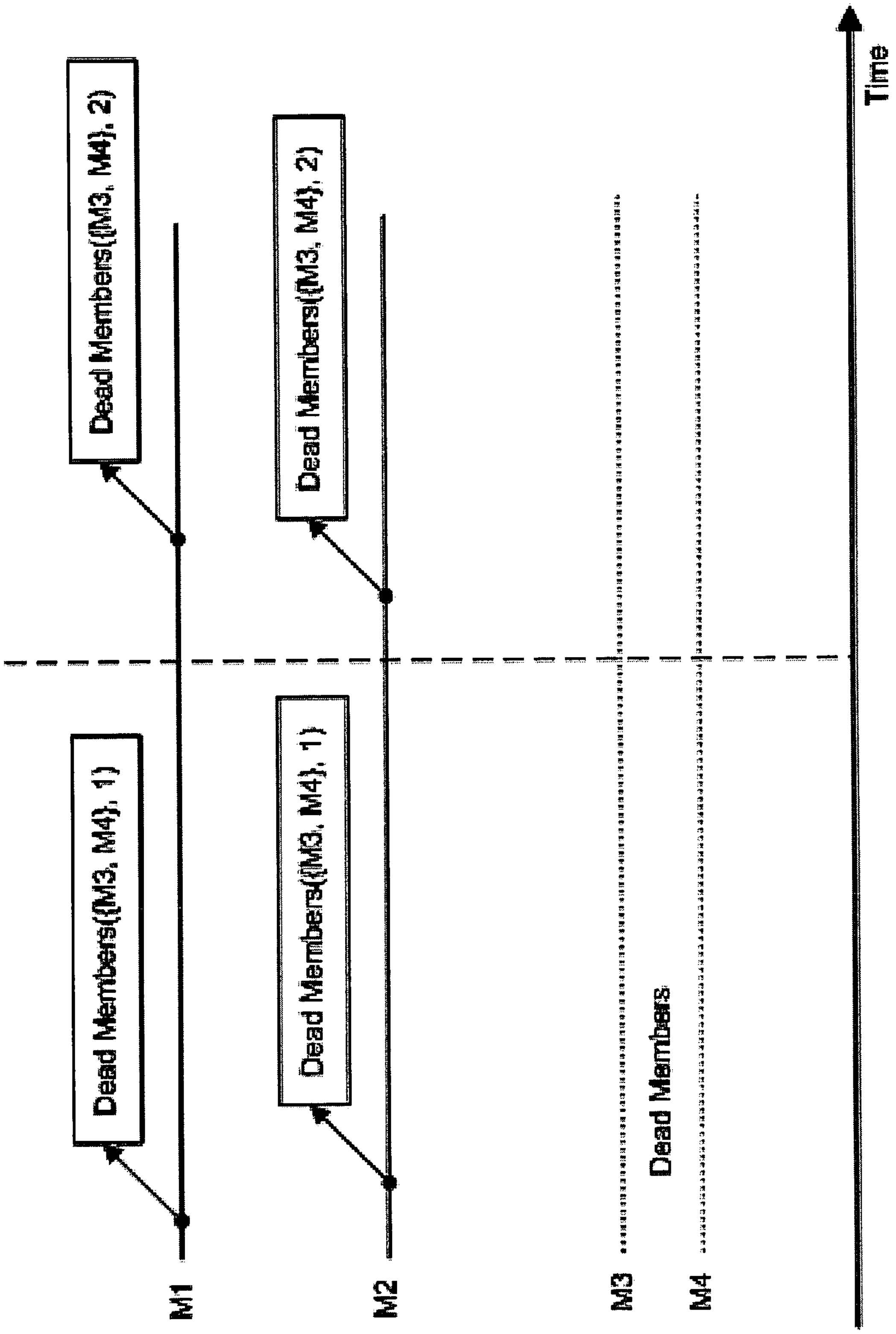
FIG. 21 is a diagram illustrating t the time relations of issuing Dead Members notification.

FIG. 20 is a diagram illustrating the time order of issuing the Reconnected Member and Reconnected Other notifications. Computers M1, M2, M3 and M4 are members of the cluster 145. Connection between M1 and M2 has been broken and is now restored. Assuming that computer M1 is the initiator of the new connection the following events occur:

1. Network manager 210 on computer M1 issues New Connection notification passing the Connection structure for computer M2 and phase "1".
2. In response to the notification cluster manager 126 on computer M1 updates the connection for the corresponding member M2 and issues Reconnected Member notification with the updated Cluster Member Structure and phase "1".

3. Network manager 210 on computer M2 issues New Connection notification passing the Connection structure for computer M1 and phase "1".
4. In response to the notification cluster manager 126 on computer M2 updates the connection for the corresponding member M1 and issues Reconnected Member notification with the updated Cluster Member Structure and phase "1".
5. Network manager 210 on computer M1 issues New Connection notification passing the Connection structure for computer M2 and phase "2".
6. In response to the notification cluster manager 126 on computer M1 issues Reconnected Member notification with the updated Cluster Member Structure and phase "2". It then sends Reconnected Other Packet to the rest of the cluster members.
7. Network manager 210 on computer M2 issues New Connection notification passing the Connection structure for computer M1 and phase "2".
8. In response to the notification cluster manager 126 on computer M2 issues Reconnected Member notification with the updated Cluster Member Structure and phase "2". It then sends Reconnected Other Packet to the rest of the cluster members.

The dashed line on the figure is represents a moment of time after step 4 but before step 5. Cluster managers on computers M3 and M4 will issue Reconnected Other notifications but only after step 6.

Cluster Guardian

The Guardian is an aspect of the cluster manager 126. Its task is to constantly monitor the wish area 186 in shared storage 180 for new "cluster wishes" (CWs) in which a computer in the cluster writes identifiers of computers which are "dead" and the number of cluster candidates, if any. In one embodiment, CWs have time stamps so that they can be identified as being young or old.

According to one embodiment, respective cluster managers 126 have two modes of operation—active and passive. Usually there's only one machine with an active Guardian within a cluster 145. The rest of the computers 110 in the cluster 145 have their guardians set to a passive mode. Only guardians in the active mode monitor the wish area for requests to modify the cluster 145.

Figure 11:
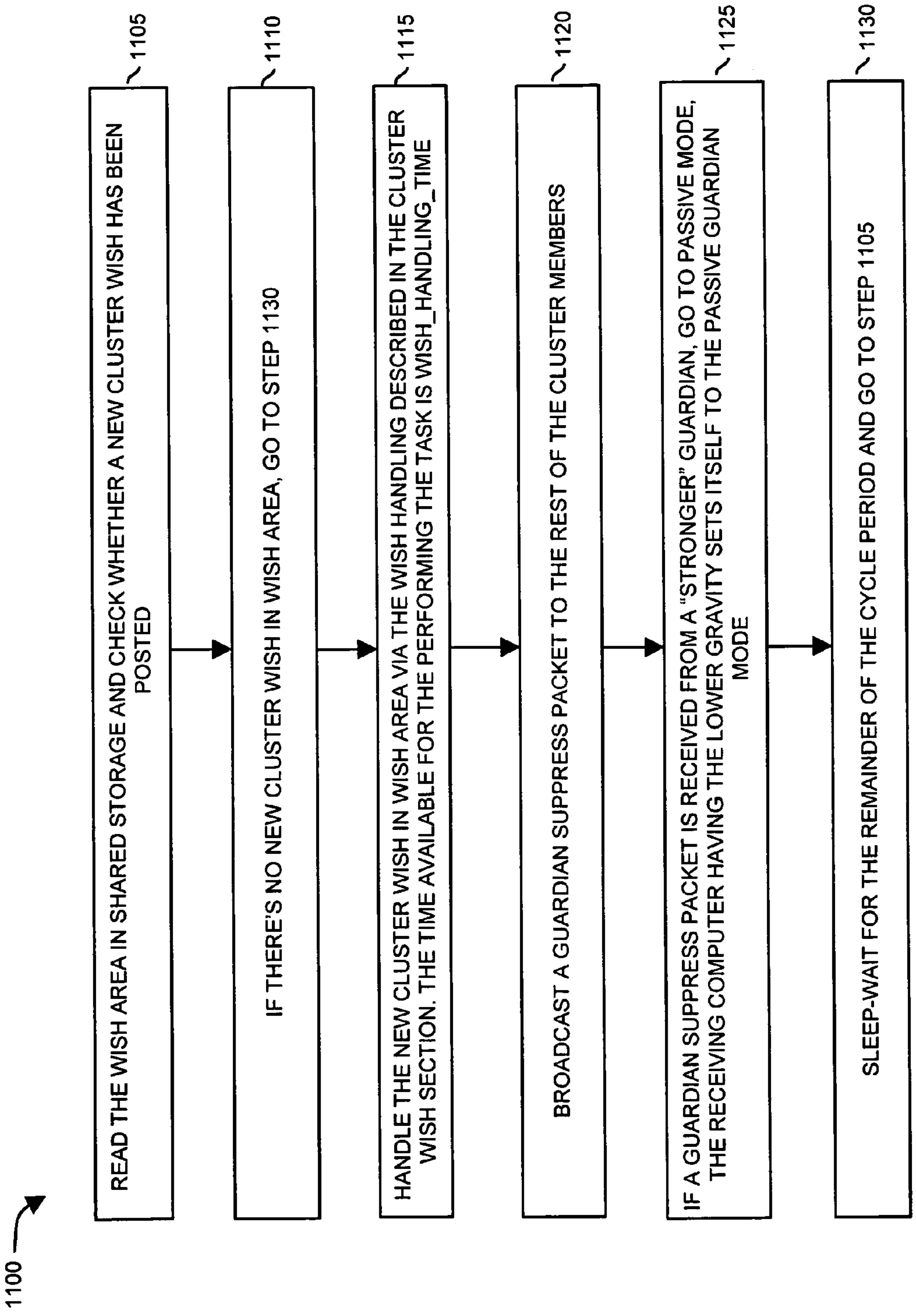
FIG. 11 is a flowchart illustrating an active cluster guardian according to an embodiment of the invention.

FIG. 11 is a flowchart 1100 illustrating an active cluster guardian procedure according to an embodiment of the invention. In this embodiment, the active guardian performs the following steps in a cyclical manner (e.g., continuously repeats the steps).

In step 1105, an active guardian reads the wish area 186 in shared storage 180 and checks whether a new cluster wish has been posted in the cluster wish area 186.

In step 1110, the active guardian in cluster manager 126 checks whether there is a new cluster wish in wish area 186. If not, flow continues at step 1130.

In step 1115, the active guardian of cluster manager 126 handles the new cluster wish in wish area 186 via the Wish Handling procedure described below in the Cluster Wish section of this specification. In one embodiment, the time available for the performing the task is WISH_HANDLING_TIME.

In step 1120, the active guardian cluster manager 126 broadcasts a Guardian Suppress Packet to the rest of the cluster members.

In step 1125, if the Guardian Suppress Packet is received from a "stronger" Guardian (e.g., from a guardian having a higher gravity), the cluster manager 126 in computer 110 having the lower gravity sets itself to the passive guardian mode. The computer 110 having the higher gravity remains in the active mode.

In step 1130, the guardian sleeps or is dormant (e.g., Sleep-wait) for the remainder of the cycle period. Thereafter, flow continues at step 1105.

In one embodiment, the cycle period of an active guardian is the same as the CYCLE_PERIOD of the DSPL (Disk Spin Lock) but a cycle can take longer if Wish Handling is involved. Also, the strength of a guardian may be determined by the index filed of the Cluster Manager.lid. Based on this routine, eventually only one Guardian in the cluster will remain as an active guardian. Once relinquishing the DSPL, the corresponding computer 110 stops writing to the DSPL area, thus allowing others to acquire the DSPL.

Figure 12:
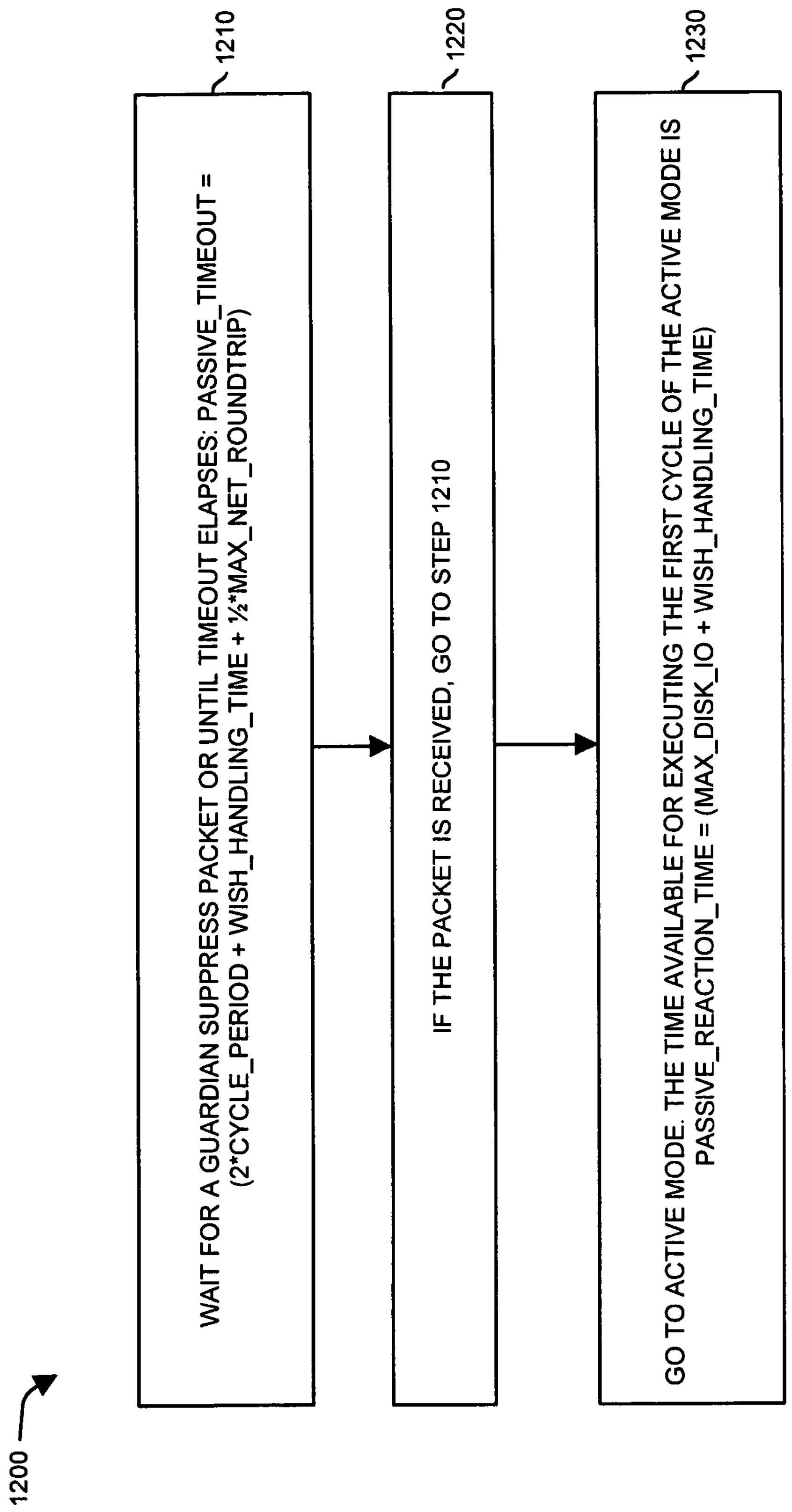
FIG. 12 is a flowchart illustrating a passive cluster guardian according to an embodiment of the invention.

FIG. 12 is a flowchart 1200 illustrating a passive cluster guardian procedure according to an embodiment of the invention. In this embodiment, the passive guardian in cluster 145 executes the following cycle.

In step 1210, the passive guardian waits for a Guardian Suppress Packet or until timeout elapses: PASSIVE_TIMEOUT=(2*CYCLE_PERIOD + WISH_HANDLING_TIME+½*MAX_NET_ROUNDTRIP).

In step 1220, if a Guardian Suppress Packet is received, continue at step 1210.

In step 1230, if a Guardian Suppress Packet is not received, the cluster manager 126 sets itself to the active mode so that it is an active guardian rather than passive guardian in the cluster 145. The time available for executing the first cycle of the active mode is:

PASSIVE_REACTION_TIME = (MAX_DISK_IO + WISH_HANDLING_TIME)

In general, the PASSIVE_TIMEOUT gives an active Guardian enough time to complete at least one full cycle (2*CYCLE_PERIOD portion) plus time for executing Wish Handling (WISH_HANDLING_TIME portion) and sending a Guardian Suppress Packet after that (½*MAX_NET_ROUNDTRIP portion). Therefore, a passive Guardian activates itself into an active guardian only if needed. This helps to avoid unnecessary disk accesses to shared storage 180.

PASSIVE_REACTION_TIME also gives the Guardian time to come out of the passive mode to read the wish area and eventually perform Wish Handling.

Cluster Wish

Figure 4:
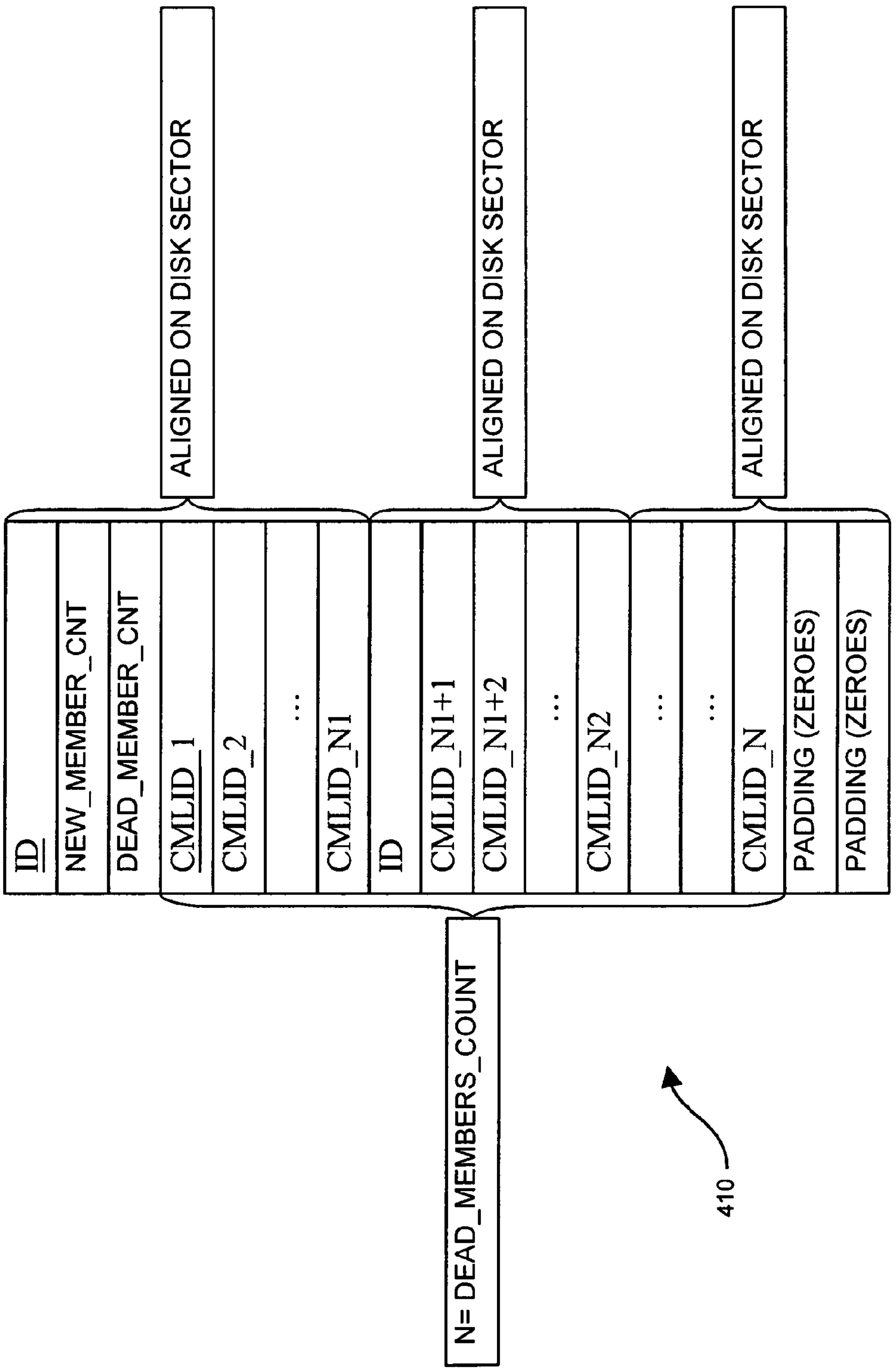
FIG. 4 is a diagram of a cluster wish format according to an embodiment of the invention.

FIG. 4 is a diagram of a Cluster Wish (CW) according to an embodiment of the invention. As discussed, computers generating the cluster wishes write the cluster wishes to cluster wish area 186 of shared storage 180.

In order to remove members from the cluster 145, a computer 110 in system 100 generates a virtual application form 410 called a Cluster Wish (CW). In one embodiment, only one machine at a time can post a CW in the cluster wish area 186 of shared storage 180. One way of achieving that only one computer post a CW is through acquisition of DSPL. The computer 110 acquiring DSPL may write the CW to shared storage 180. As discussed, a CW written to shared storage 180 contains a list of CMLIDs identifying the members to be removed from the cluster 145. CW also contains the number of cluster candidates that would like to join the cluster 145 at the time the CW is posted.

To post a new CW, a machine writes it into the wish area 186 as shown in the shared storage 180 of FIG. 1. Similar in some respects to the Cluster Table written to cluster member list 182, all entries in a CW are aligned to a disk sector as illustrated in FIG. 4. In addition, a Host Stamp (an identifier of the computer placing the cluster wish) is included at the beginning of each sector. This serves not only distinguishes a difference between different CWs, but also enables a checker (e.g., a Guardian computer in system 100 or cluster 145) to determine if a CW is completely written. In one embodiment, a CW is considered completely written if all the sectors of the Wish Area bear the same Host Stamp.

After posting a CW, the computer 110 initiating the CW waits for WISH_GRANT_WAIT = (PASSIVE_TIMEOUT+ PASSIVE_REACTION_TIME) and reads the wish area again. If the CW is intact (e.g., it has not been overwritten or a specific portion has not been overwritten by another computer not making the CW) after WISH_GRANT_WAIT, the CW is considered to be granted. In case any sector of the wish is erased (filled with zeroes), then the CW has been denied. The delay time WISH_GRANT_WAIT gives enough time for passive Guardians to react to the new CW since their reaction is slower compared to active Guardians.

The active Guardian (e.g., a cluster manager 126 in a computer 110 of cluster 145) monitors and handles new CWs. When the guardian encounters changes in the wish area the Guardian checks if the newly posted CW is complete. If the CW is not complete, the Guardian sleep-waits (e.g., waits) for an additional MAX_DISK_IO. This allows time to the wisher to complete the CW. The Guardian, after the MAX_DISK_IO, the rereads contents of the CW in wish area 186 of shared storage 180. If the CW is still not completely written, the Guardian denies it by erasing at least a portion of the contents in the cluster wish area 186.

If and when the complete CW is finally read after waiting the MAX_DISK_IO, the Guardian decides whether to silently accept or deny the CW. That is, if the Guardian does not write over contents of the CW, then the CW is "silently" accepted. Alternatively, the Guardian (i.e., cluster manager 126) may write over a portion of the CW to deny the CW.

If the list of "dead" members (e.g., members not-responding to communications initiated by the initiator of the CW) in the CW does not include the Guardian machine itself, the Guardian simply stops sending Guardian Suppress Packets to the members listed in the CW. This causes corresponding Guardians to become activated (e.g., they turn into active guardians instead of passive guardians) and check the CW for themselves. If any of the other Guardians denies the CW at some later point in time, the Guardian that initially spotted the new CW will resume sending Guardian Suppress Packet to all the cluster members.

If however the CW lists the Guardian machine itself as "dead," the active Guardian broadcasts a Cluster Query Packet to check the actual number of cluster members that are presently connected to (or in communication with) the Guardian machine. Using this number and the number of cluster candidates stated in the CW, the Guardian judges whether to accept or deny the CW. In one embodiment, the Guardian prefers to establish large sets of machines in a cluster over smaller ones. So, in such an embodiment, if the wisher is about to establish a cluster set larger than the one the Guardian is currently in, the Guardian would be willing to "sacrifice" its membership for the sake of creating a larger cluster. In the latter case, the Guardian would do so by executing the Cluster Shutdown routine (FIG. 17) and generate an error code (e.g., THROWN_OUT_OF_CLUSTER). If the CW includes a wish for a new cluster that is smaller than the current cluster, the Guardian denies the CW. In one embodiment, a listing of a number (e.g., zero or more) of cluster candidates from the CW is utilized along with a list of dead members to make a decision of accepting or denying a wish. The above procedure including identifying the changes (e.g., entry of CW) in the wish area 186 and accepting or denying the CW is called Wish Handling. The time available for Wish Handling is WISH_HANDLING_TIME = (WISH_COMPLETION_DELAY+NET_TALK + MAX_DISK_IO), where WISH_COMPLETION_DELAY = (MAX_DISK_IO +MAX_SLEEP_DELAY + MAX_DISK_IO), which is the time required to wait for and then reread the CW after it was incomplete. The balance of the WISH_HANDLING_TIME provides the time necessary for broadcasting Cluster Query Packets and waiting for replies from other computers 110 in the cluster 145 receiving the packets as well as eventually denying the CW thereafter.

After a CW has been granted, the initiator notifies previously existing members of the cluster 145 the update first and thereafter notifies the other candidate that they are now members. Thus, this is a two-phase process. The newly notified members notify the upper software layers of the change.

The initiator also updates the cluster table in shared storage 180 to include the new members.

Figure 6A:
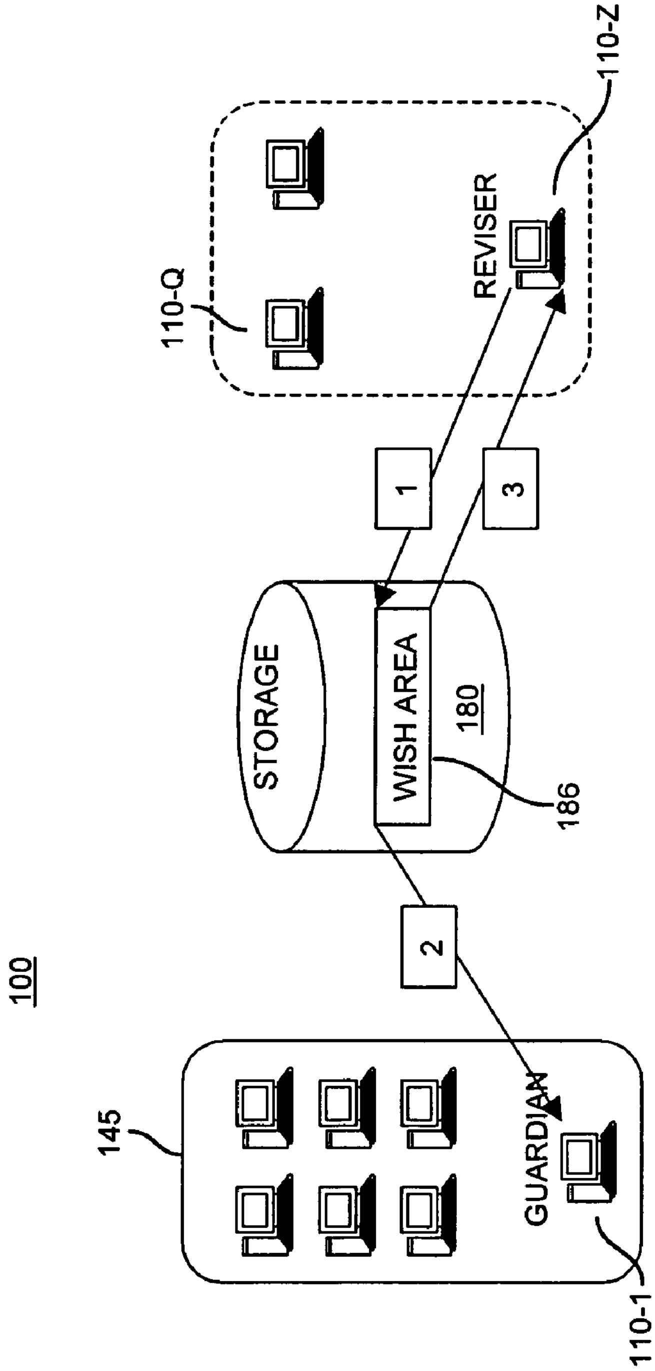
FIGS. 6A and 6B are diagrams respectively illustrate acceptance and denial of a cluster wish according to an embodiment of the invention.
Figure 6B:
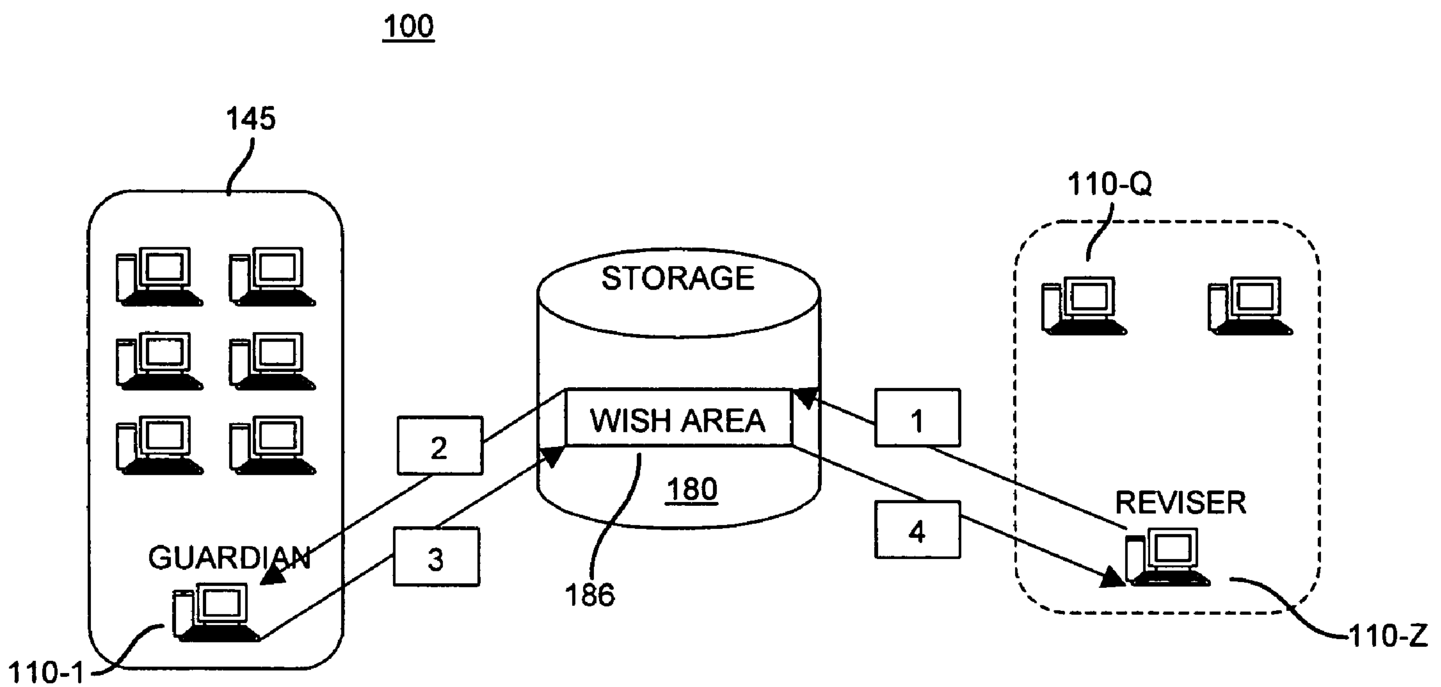

FIGS. 6A and 6B are diagrams illustrating acceptance and denial of a cluster wish according to an embodiment of the invention.

As shown in FIG. 6A, the reviser computer 110-Z in system 100 writes a CW in wish area 186 and waits a specified amount of time, namely, WISH_GRANT.

The guardian computer 110-1 in cluster 145 reads the wish and silently accepts. That is, the guardian computer 110-1 in cluster 145 does not overwrite the CW written to shared storage 180.

The reviser computer 110-Z, after the wait time, reads the CW in the wish area 186 and learns that the CW has been accepted based on failure of the Guardian computer 110-1 to overwrite the CW or portion thereof.

As shown in FIG. 6B, the reviser computer 110-Z in system 100 writes a CW in wish area 186 and waits a specified amount of time, namely, WISH_GRANT.

The guardian computer 110-1 in cluster 145 reads the wish and finds it unacceptable, possibly because the CW does not include the Guardian as a member.

The guardian computer 110-1 in cluster 145 overwrites at least a portion of the CW in shared storage 180 to indicate denial of the CW.

The reviser computer 110-Z, after the wait time, reads the CW in the wish area 186 and learns that the CW has been denied based on a modification of data in the CW.

Figure 8:
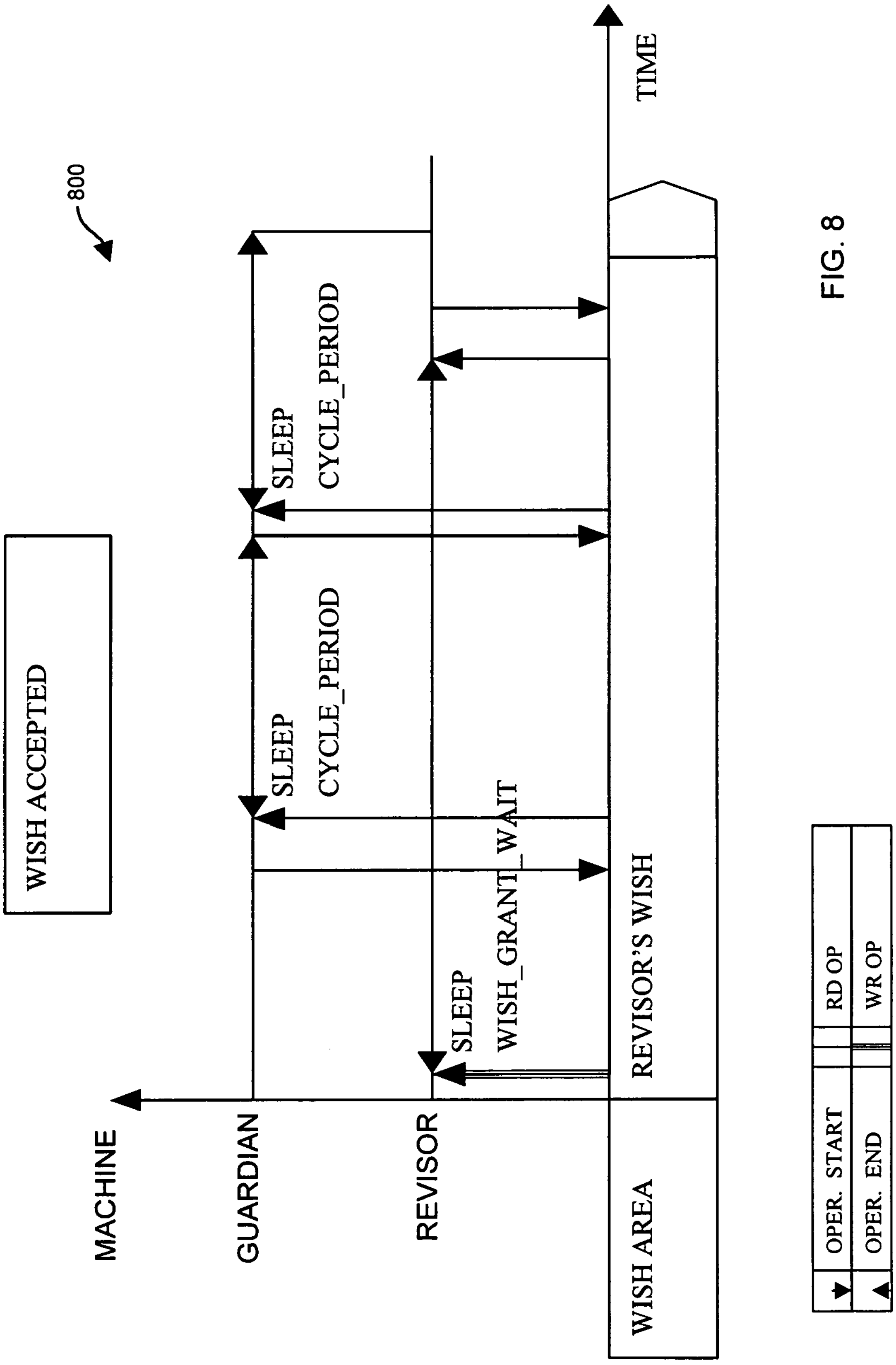
FIG. 8 is a diagram illustrating acceptance of a cluster wish according to an embodiment of the invention.

FIG. 8 is a timing diagram 800 illustrating acceptance of a cluster wish according to an embodiment of the invention.

Figure 9:
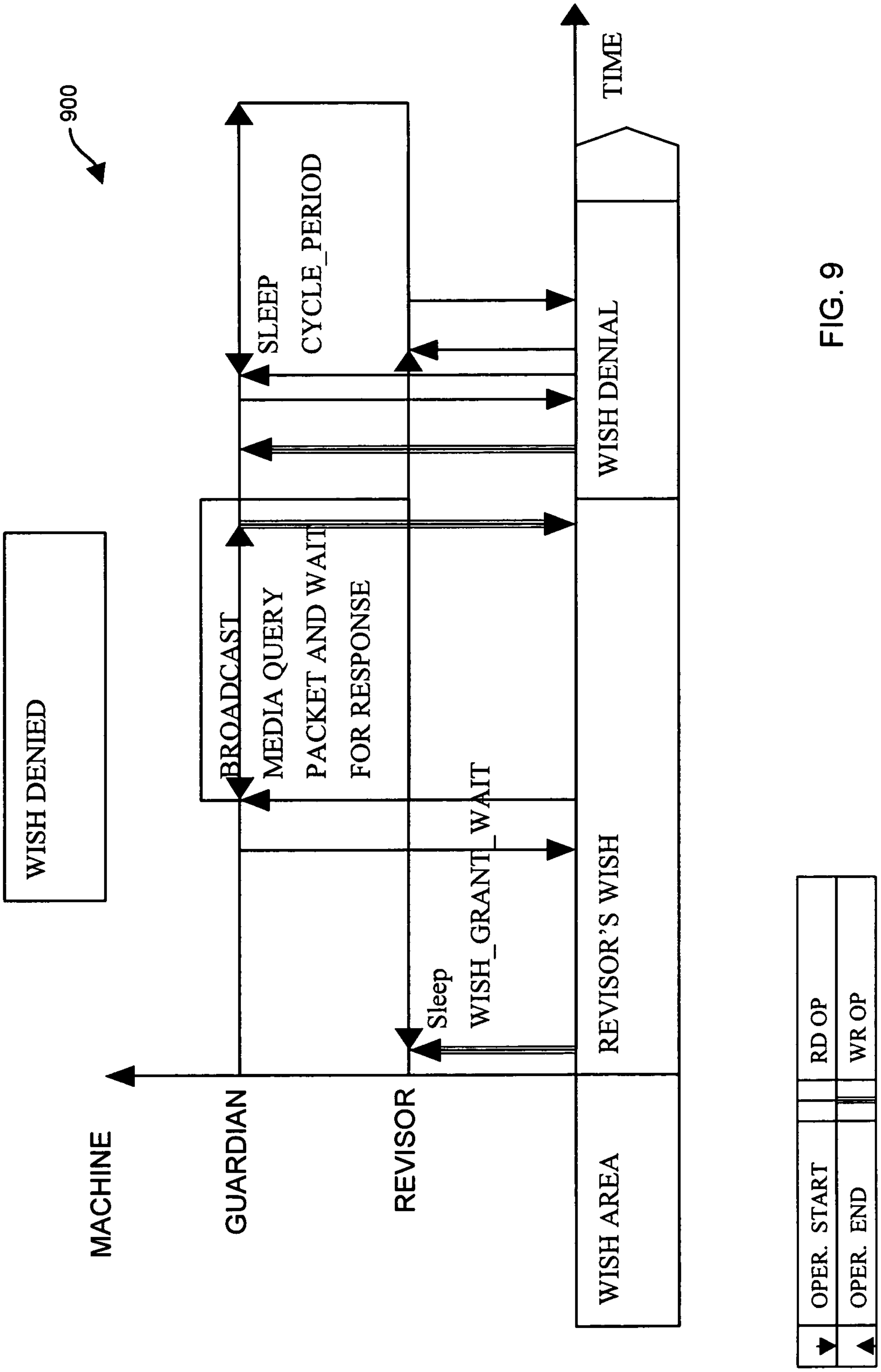
FIG. 9 is a diagram illustrating denial of a cluster wish according to an embodiment of the invention.

FIG. 9 is a timing diagram 900 illustrating denial of a cluster wish according to an embodiment of the invention.

Figure 10:
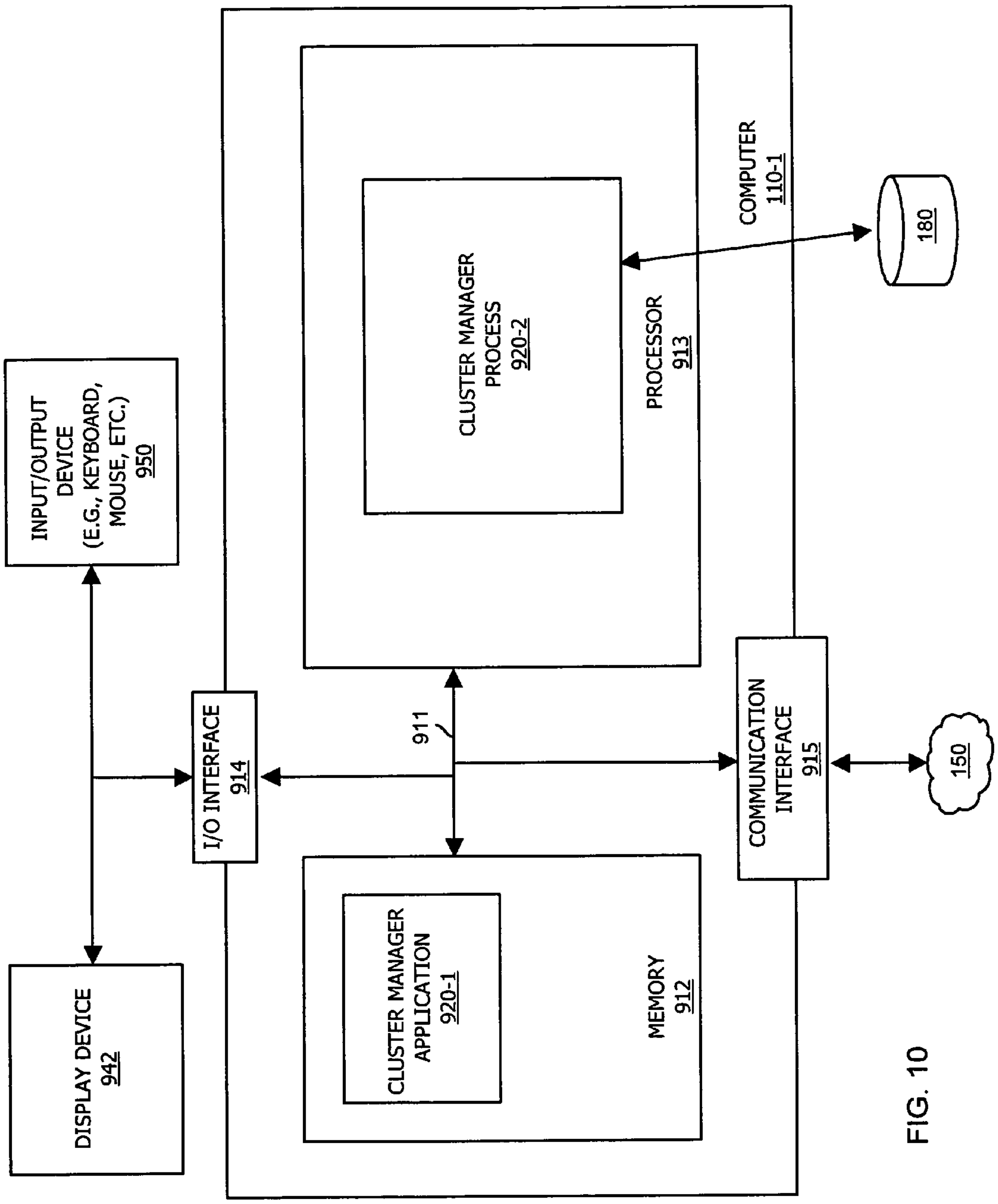
FIG. 10 is a block diagram of sample hardware architecture associated with computers in a cluster according to an embodiment of the invention.

FIG. 10 is a block diagram illustrating an example architecture of computer system 110 according to embodiments of the invention. Computer system 110 may be a computerized device such as a personal computer, workstation, portable computing device, console, network terminal or the like. As shown, computer system 110 of the present example includes an interconnect 911 that couples a memory system 912, a processor 913, an input/output interface 914 and a communications interface 915. Input/Output devices 950 (e.g., one or more viewer controlled devices such as a keyboard, mouse, etc.) couples to processor 913 through I/O interface 914 and enables a user at computer 110 to provide input commands from applications running on computer 110. Display device 942 provides information to a user of computer 110. Computer 110 couples to shared storage 180 via a respective link 151 (e.g., a fiber cable supporting high speed communications). Communications interface 915 enables computer system 110 (and corresponding user 108 at computer 110) to communicate with other computers in a cluster via network 150.

As shown, memory 912 is encoded with cluster manager application 920-1 supporting the functionality as previously discussed. The cluster manager application 920-1 may be embodied as software code such as data and/or logic instructions (e.g., code stored in the memory or on another computer readable medium such as a disk) that supports processing functionality according to different embodiments of the invention as described herein. During operation, processor 913 accesses memory 912 via the interconnect 911 in order to launch, run, execute, interpret or otherwise perform the logic instructions of the cluster manager application 920-1. Execution of cluster manager application 920-1 produces processing functionality in cluster manager process 920-2 (a.k.a., cluster manager 126 as discussed above). In other words, the cluster manager process 920-2 represents one or more portions of the cluster manager application 920-1 (or the entire application 920-1) performing within or upon the processor 913 in the computerized device 110. In a similar vein, computer 110 also supports functionality associated with other modules discussed above.

Cluster Revise Procedure

FIGS. 13A and 13B combine to form a flowchart 1300 illustrating a Cluster Revise method according to an embodiment of the invention. Revising a cluster can be necessary when failed cluster members are detected. In one embodiment, this method is also executed as part of the Enter Cluster procedure (FIG. 15). In one embodiment, the revise procedure is executed by a member (e.g., a reviser) of the cluster that detected failed cluster members. In step 1305, a reviser computer 110 (e.g., a computer trying join the cluster 145 or form a new cluster or a member of the cluster that detected failed cluster members) in system 100 reads the Cluster Table in shared storage 180 and stores it in local memory. The computers extract the list of current members from the cluster table.

In step 1310, the reviser computer 110 broadcasts a Cluster Query Packet to all connected hosts computers in system 100 or cluster 145. The computer waits until all connected hosts reply or MAX_NET_ROUNDTRIP timeout elapses for receiving the replies.

a.) Current cluster members of the concerned cluster reply with a packet containing their CMLID.

b.) Cluster candidates in system 100 (such as computers 110-Q and 110-Z) reply with a packet demonstrating their desire to enter the cluster.

c.) The balance of computers in system 100 reply with a packet stating that the specified cluster is of no interest to them.

In step 1315, the reviser computer compares the lists of current members extracted from the cluster table with the list of replies from step 1310. If a cluster member present in the cluster table did not reply the query packet, it is marked as "dead".

In step 1320, the reviser computer prepares a CW containing a list of "dead" members' CMLIDs and the count of cluster candidates wishing to be part of the cluster. The wish is written to a designated Wish Area 186 in the shared storage 180. If no dead members are present in the CW, then go to step 1330.

In step 1325, the reviser computer waits for a WISH_GRANT_WAIT period to elapse and then reads the ID portion of the CW in the wish area. If the ID is NULL, the reviser computer knows that the CW has been denied as discussed above and processing continues at step 1380 with error code ACCESS DENIED. If the ID in the CW previously written to wish area 186 of shared storage 180 is untouched as discussed, then the reviser knows that CW has been granted.

In step 1327, the reviser computer updates the in-memory copy of the Cluster Table by marking the slots taken by the "dead" members as free.

In step 1330, the reviser computer updates the in-memory copy of the Cluster Table by adding the cluster candidates to the table. Also, the reviser computer adds itself to the list if it is also a candidate for adding (see Enter Cluster Procedure in FIG.). If the Cluster Table is full, the reviser computer discards the extra candidates. If the reviser itself is the candidate computer and the table is full, process flow continues at step 1380 with error code CLUSTER FULL.

In step 1335, the reviser computer broadcasts a Pre-Invitation Packet to the candidates. If no "dead" members are detected, flow continues at step 1360.

In step 1340, the reviser computer broadcasts a Dead Members List Packet, with phase field set to "1", containing the CMLIDs of the "dead" members to the rest of the current members and then waits until all of them reply or until MAX_NET_ROUNDTRIP timeout elapses. If some cluster members fail to reply within the timeout, then the non-responding computers probably have also died. So, the whole revise procedure must be repeated from step 1305.

In step 1345, the reviser computer, if it is already a member, issues a Dead Members Notification. It passes the list of "dead" members for the "members" parameter and "1" for the "phase" parameter of the notification.

In step 1350, the reviser computer broadcasts the same packet as in step 1340 but with phase field set to "2" and then waits until all of them reply or until MAX_NET_ROUNDTRIP timeout elapses. If some cluster members fail to reply within the timeout, then the non-responding computers probably have also died. So, the whole revise procedure must be repeated from step 1305.

In step 1355, the reviser computer, if it is already a member, issues a Dead Members Notification. It passes the same list of "dead" members for the "members" parameter and "2" for the "phase" parameter of the notification.

In step 1360, the reviser computer writes the updated Cluster Table to shared storage 180.

In step 1365, the reviser computer, if it is a "candidate," broadcasts a New Cluster Member Packet, with phase field set to "1," to the current members of cluster 145 and then waits until all of them reply or until MAX_NET_ROUNDTRIP timeout elapses. If some cluster members fail to reply within the timeout the execution continues at step 1380 with error code NETWORK TIMEOUT.

In step 1370 the reviser computer if it is a "candidate," issues a Joined Cluster Notification (passing a list of current members) and again broadcasts a New Cluster Member Packet, this time with phase field set to "2," to the current members of cluster 145.

In step 1375, the reviser computer returns a success message.

In step 1380, the reviser computer shutdowns the cluster and returns an error code.

Invitation Validation Procedure

Figure 7:
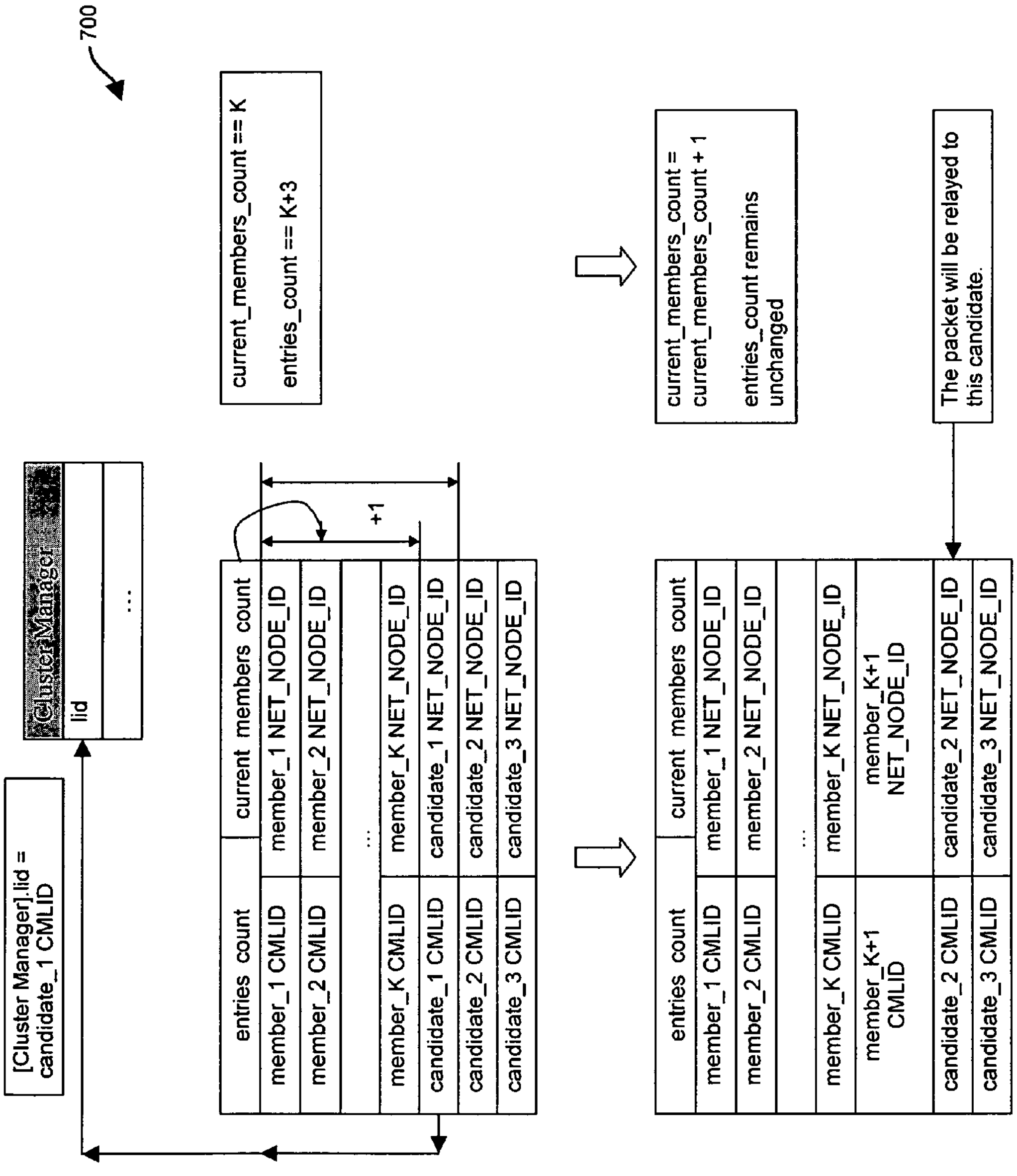
FIG. 7 is a diagram of a cluster invitation according to an embodiment of the invention.

FIG. 7 is a diagram of a cluster invitation 700 according to an embodiment of the invention.

Figure 14A:
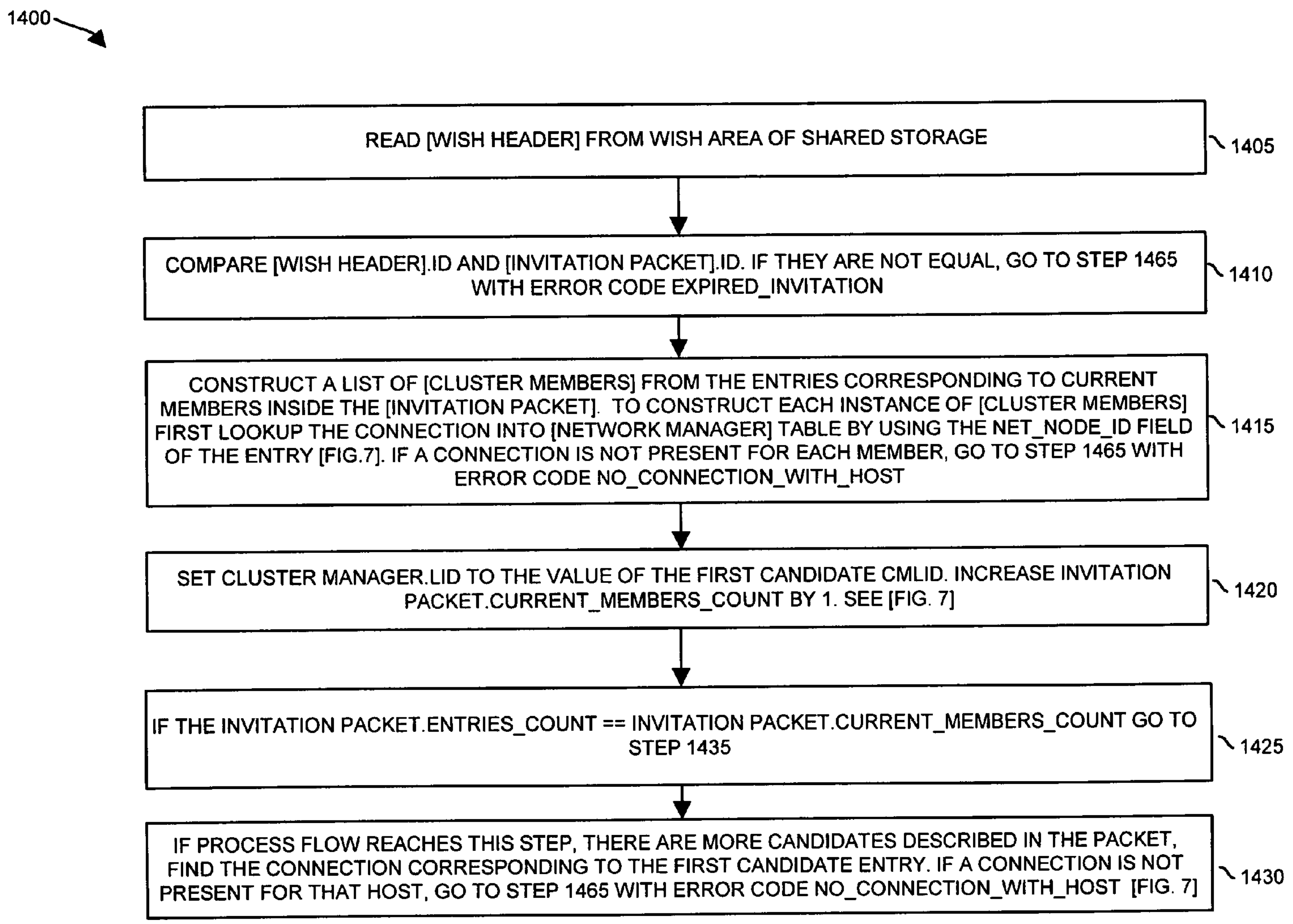
FIGS. 14A and 14B combine to form a flowchart illustrating an invitation validation procedure according to an embodiment of the invention.
Figure 14B:
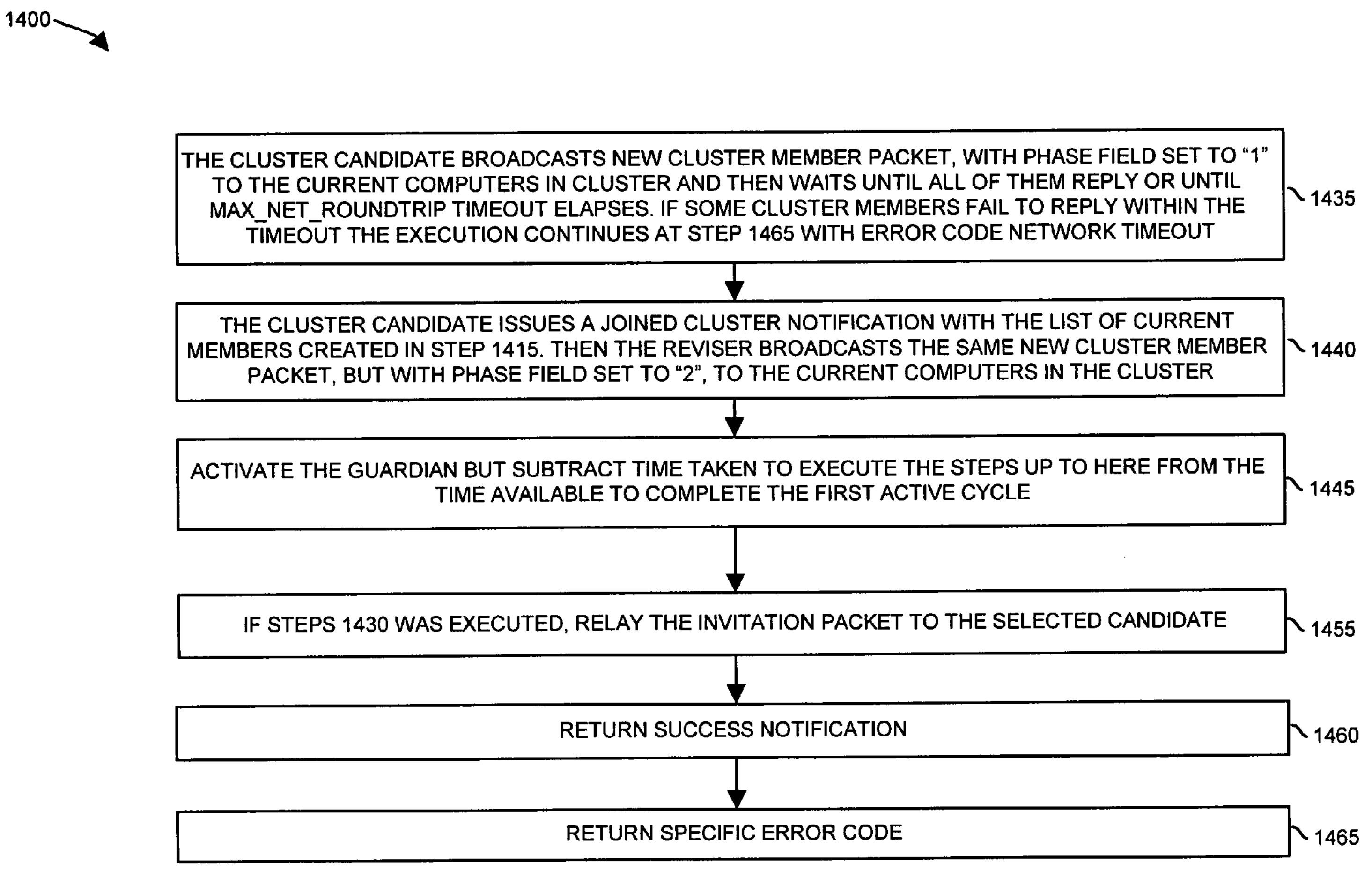

FIGS. 14A and 14B combine to form a flowchart 1400 illustrating a routine executed by a cluster candidate upon entering the cluster 145 according to an embodiment of the invention.

In step 1405, a cluster candidate reads a [Wish Header] from the wish area 186 of shared storage 180.

In step 1410, a cluster candidate compares [Wish Header].id and [Invitation Packet].id. If they are not equal, process flow continues at step 1465 with generation of an error code EXPIRED_INVITATION.

In step 1415, the cluster candidate constructs a list of [Cluster Members] from the entries corresponding to current members inside the [Invitation Packet]. To construct each instance of [Cluster Members], the cluster candidate first looks up the connection in [Network Manager] table by using the net_node_id field of the entry (see FIG. 7). If a connection is not present for each member, process flow continues at step 1465 with generation of error code NO_CONNECTION_WITH_HOST.

In step 1420, the cluster candidate sets Cluster Manager.lid to the value of the first candidate CMLID as well as increases Invitation Packet.current_members_count by 1 (also see FIG. 7).

In step 1425, the cluster candidate determines if the Invitation Packet.entries_count = Invitation Packet.current_members_count. If so processing continues at step 1435.

In step 1430, the cluster candidate detects that there are more candidates described in the packet associated with the determination in step 1425. The cluster candidate then finds the connection corresponding to the first candidate entry. If a connection is not present for that computer 110, process flow continues at step 1465 with error code NO_CONNECTION_WITH_HOST (See FIG. 7).

In step 1435, the cluster candidate broadcasts New Cluster Member Packet, with phase field set to "1", to the current computers 110 in cluster 145 and then waits until all of them reply or until MAX_NET_ROUNDTRIP timeout elapses. If some cluster members fail to reply within the timeout the execution continues at step 1465 with error code NETWORK TIMEOUT.

In step 1440, the cluster candidate issues a Joined Cluster notification with the list of current members created in step 1415. Then it broadcasts the same New Cluster Member Packet, but with phase field set to "2", to the current computers 110 in cluster 145

In step 1445, the cluster candidate "activates" the Guardian but subtracts time taken to execute the steps up to this point from the total time available to complete the first active guardian cycle.

In step 1455, the cluster candidate determines if step 1430 was executed and relays the Invitation Packet to the selected candidate.

In step 1460, the cluster candidate returns a SUCCESS message.

In step 1465, the cluster candidate returns a specific error code as discussed.

Enter Cluster Procedure

FIG. 15 is a flowchart 1500 illustrating a method for entering a cluster according to an embodiment of the invention. To enter a cluster, candidates execute the following steps.

In step 1505, the candidate computer in system 100 runs a separate thread to acquire the DSPL by writing to disk spinlock region 184 in shared storage 180.

In step 1510, the candidate computer wait for one of the following events:

a. DSPL is acquired. If so, processing continues at step 1525.

b. Pre-Invitation Packet arrives.

In step 1515, the candidate computer stops the thread that's competing for the DSPL and waits for [Invitation Level 2 Packet] to arrive or INVITATION_TIMEOUT = 2*CYCLE_PERIOD time to elapse. If the timeout elapses without receiving Invitation Packet, process flow continues at step 1505.

In step 1520, the candidate computer executes Invitation Validation Procedure (FIGS. 14A and 14B).

a. If result is EXPIRED_INVITATION, process flows continues at step 1505.

b. If the result is SUCCESS, process flow continues at step 1535.

c. On any other error code, process flow continues at step 1540.

In step 1525, the candidate computer executes Cluster Revise Procedure (FIGS. 13A and 13B).

a. On success, the cluster manager 126 of the candidate activates the Guardian.

b. On detection of an error, go to step 1540.

In step 1530, the candidate computer releases the DSPL.

In step 1535, the candidate computer sets its Cluster State to MEMBER. Flow completed.

In step 1540, the candidate computer aborts and shuts down the cluster with the appropriate error code.

Leave Cluster Procedure

FIG. 16 is a flowchart 1600 illustrating a leave cluster procedure according to an embodiment of the invention.

In step 1605, a computer 110 and corresponding cluster manager 126 wishing to leave the cluster 145 acquire DSPL.

In step 1610, the computer attempting to leave the cluster 145 reads the Cluster Table from the shared storage 180 and stores the table locally into memory. The computer and marks its previously used slot as free.

In step 1615, the computer 110 broadcasts a Dead Members List Packet, phase field set to "1" and with a single CMLID inside, which is the CMLID of the computer. In step 1620, the computer 110 waits for all the current members to acknowledge the receipt of the packet or until MAX_NET_ROUNDTRIP timeout elapses.

In step 1625, the computer 110 checks whether any cluster members do not reply to the message in step 1620. If so, flow continues at step 1660.

In step 1630, the computer broadcasts to the current members of cluster 145 the same packet as in step 1615 but with phase field set to "2". In step 1635, the computer 110 waits for all the current members to acknowledge the receipt of the packet or until MAX_NET_ROUNDTRIP timeout elapses.

In step 1640, the computer 110 checks whether any cluster members do not reply to the message in step 1630. If so, flow continues at step 1660.

In step 1645, the computer 110 writes the updated Cluster Table to storage.

In step 1650, the computer 110 releases the DSPL.

In step 1655, the computer 110 shuts down Cluster with error code SUCCESSFULLY_LEFT_CLUSTER. Flow completed.

In step 1660, the computer 110 shuts down Cluster with error code NETWORK_TIMEOUT.

Shutdown Cluster Procedure

FIG. 17 is a flowchart 1700 illustrating a method for shutting down a cluster according to an embodiment of the invention.

In step 1710, the computer (e.g., an active guardian cluster manager 126) shutting down the cluster 145 issues an Emergency Shutdown notification broadcasted to the members.

In step 1720, the computer deactivates the Guardian.

In step 1730, the computer stops any attempts to acquire the DSPL.

In step 1740, the computer broadcasts a Revision Advise Packet to the current members of the cluster 145.

As discussed, techniques of the invention are well suited for use in applications in which multiple computers in a networked computer system communicate (e.g., arbitrate negotiate, coordinate, etc.) amongst each other to access the same regions of shared storage. However, it should be noted that embodiments of the invention are well suited for other than the above discussed applications and thus are not limited to such use.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

Data Structures

Globally Unique Identifier (GUID)

This is a worldwide unique identifier generated by the system. It's an opaque 128-bit structure. CM uses such IDs for identification before in the entering process or communication with machines that may not yet be cluster members.

Cluster Member Local ID (CMLID)

This structure identifies a machine within a cluster.

| Cluster Member Local ID (CMLID) | | |
|---|---|---|
| Field | Type | Description |
| Index | Integer | Index of a slot in the cluster table. |
| Generation | Integer | Corresponds to the generation field of the entry in the cluster table. |

On-storage Structures

Cluster Descriptor

Contains some global constants for the cluster.

| Cluster Table Slot | | |
|---|---|---|
| Field | Type | Description |
| cluster_id | GUID | Unique identifier of the cluster. |
| cluster_timings | Cluster Timings | These timings are common for all machines that access the storage. |

Cluster Table Slot

The building blocks of the Cluster Table.

| Cluster Table Slot | | |
|---|---|---|
| Field | Type | Description |
| generation | Integer | Unique identifier of the slot's owner. Each owner's generation is at least 1 bigger than the previous owner's generation. |
| occupied | Boolean | Tells whether this slot is in use. |

Host Computer Stamp

Used alone in the process of acquiring and guarding the Disk Spinlock and as a part of a Cluster Wish. The time_stamp field is used to distinguish between two different consecutive writes of this structure to storage.

| | | |
|---|---|---|
| | | |
| | | |

Cluster Wish

Also see Cluster Wish section for a detailed explanation.

| Cluster Wish | | |
|---|---|---|
| Field | Type | Description |
| id | Host Stamp | Identifies the host making the wish. The time_stamp field of the structure is used to identify two different but successive wishes of the same host. |
| new_members_count | Integer | How many new machines are to join the cluster. |
| dead_members_count | Integer | How many machines are to be removed from the cluster. |
| dead_members | Array of CMLIDs | The size of the array is specified in the previous field. Should the array span multiple disk sectors it is split and an ID field is placed in the beginning of each sector. |

In-memory Structures

Connection

For a TCP connection.

| Connection | | |
|---|---|---|
| Field | Type | Description |
| net_node_id | Connection ID | Id of the host in the connection graph. |
| handle | TCP connection handle | Handle to a connection. Returned by the system upon creating a connection. |

Network Manager

The Network Manager exports a list of Connection structures for use by CM.

Cluster Member

Describes another member of the cluster.

| Cluster Member | | |
|---|---|---|
| Field | Type | Description |
| lid | CMLID | The local (in-cluster) id of the cluster member. |
| connection | Connection | TCP channel to use for communication with this cluster member. |

Cluster Manager

These are the public data fields of the CM that are available to upper levels.

| Cluster Manager | | |
|---|---|---|
| Field | Type | Description |
| lid | CMLID | The local (in-cluster) id of the current machine for this particular cluster. Valid only after becoming a cluster member. |
| gid | GUID | Globally unique identifier of the current machine. Used only for Host Stamp. |
| cluster_id | GUID | Globally unique identifier of the cluster. Kept on a designated location on the storage and read once before entering cluster. |
| current_members | Array of Cluster Member structures. | |
| | | |

Network Packets

Network Packet Header

This is a common part of all network packets that are used by CM.

| Network Packet Header | | |
|---|---|---|
| Field | Type | Description |
| target_cluster_id | GUID | Identifies the cluster that is the recipient of the packet. Its needed because a single machine may be a member of multiple clusters. |
| source_member_id | CMLID | Identifies the sender of the packet within the cluster specified by target_cluster_id. |

Cluster Query Packet

This packet contains only the common header. The target_cluster_id specifies the cluster ID of the cluster in question. source_member_id is irrelevant.

Pre-Invitation Packet

This packet contains only the common header. This packet is sent to cluster candidates. Upon receipt, they temporarily seize attempts to acquire the Disk Spinlock. Then they begin waiting for an Invitation Packet for a certain period. If the timeout elapses without receiving it candidates resume their attempts to acquire the DSPL.

Invitation Packet

Aside from the common header, this packet contains a list of couples: CMLIDs together with network node IDs. Each couple can be used to construct Cluster Member structure from it [FIG. 7].

| Invitation Packet Entry | | |
|---|---|---|
| Field | Type | Description |
| lid | CMLID | The local (in-cluster) id of the cluster member. |
| net_node_id | Net Node ID | Corresponds to a **net_node_id** field of a Connection in the list of connections kept by the Network Manager. |

| Invitation Packet | | |
|---|---|---|
| Field | Type | Description |
| entries_count | Integer | Total number of entries in the packet. |
| current_members_count | Integer | Specifies how many of the enries are already cluster members. The rest of the entries are cadidates. Therefore current_members_count is less than or equal to entries_count. entries_count minus current_members_count gives the number of candidates. |
| entries | Array of Invitation Packet Entry | Current members come first. |

Dead Members List Packet

Aside from the common header, this packet contains a list of CMLIDs describing "dead" members of the cluster. It also contains the notification phase. The recipient fires a "Dead Members" Notification passing the list and the phase contained in the packet. It also updates Cluster Manager.current_members by removing the members identified in the packet.

New Cluster Member Packet

The source_member_id field of the common header identifies the new member within the cluster. The packet also contains the notification phase. The recipient uses the source_member_id field together with the connection from which the packet was received to construct a Cluster Member structure. This structure is then added to Cluster Manager.current_members list, if it's not already present. Afterwards a "New Member" notification is fired passing the Cluster Member structure and the phase.

Reconnected Other Packet

The target_cluster field of the common header specifies a cluster. The recipient cluster manager issues a Reconnected Other notification.

Revision Advise Packet

The target_cluster field of the common header specifies a cluster, which is to be revised. The recipient schedules a Cluster Revise for that cluster.

What is claimed is:

1. In at least one computer, which is at least one of multiple computers in a cluster having access to a shared storage system, a method of facilitating access to the shared storage system comprising:

maintaining a list identifying which of the multiple computers are members of the cluster having access to the shared storage system;

communicating with the multiple computers in the cluster i) via use of a network supporting communications from the multiple computers amongst each other, and ii) through accesses to the shared storage system to which each of the computers in the cluster have access;

initiating a modification to members included in the cluster based upon communications over the network and through the shared storage system;

periodically reading a designated location in shared storage system to identify a request by a first computer not in the cluster to join the cluster, the request including a unique identifier written by the first computer to the designated location; and refraining the at least one computer from writing over the unique identifier in the designated location to indicate that the request by the first computer to join the cluster has been granted.

2. A method as in claim 1, wherein communicating with the multiple computers in the cluster through accesses to the shared storage system involves members of the cluster reading and writing to designated locations in the shared storage system.

3. A method as in claim 2, wherein the reading and writing to the designated locations of the shared storage system occurs in response to at least one of:

i) a non-member of the cluster trying to join the cluster but who is unable to communicate with the at least one computer over the network;

ii) a member of the cluster being unable to communicate with another member of the cluster over the network.

4. A method as in claim 1 further comprising:

in response to the communicating, identifying which if any of the multiple computers in the cluster lacks an ability to communicate with each of the other computers in the cluster; and initiating removal of any computers from the list in which the corresponding computers lack the ability to communicate with each of the other computers in the cluster.

5. A method as in claim 1, wherein communicating with the multiple computers includes transmitting messages to each of the multiple computers in a cluster having corresponding links to access the shared storage, the corresponding links being independent of the network.

6. A method as in claim 1 further comprising:

detecting a failed computer in the cluster of multiple computers based on lack of receiving messages from the failed computer;

notifying other non-failing computers in the cluster of multiple computers of the failed computer; and removing the failed computer from being a member of the cluster.

7. A method as in claim 6 further comprising:

initiating removal of the failed computer from the list so that the failed computer is no longer a member of the cluster, the at least one computer communicating with other members in the cluster over the network to identify that the failed computer is no longer a member of the cluster, remaining members of the cluster other than the failed computer updating their corresponding lists to remove the failed computer from the cluster.

8. A method as in claim 1, wherein communicating with the multiple computers in the cluster through accesses to the shared storage system further includes:

periodically reading the designated location in the shared storage system to identify a request by a second computer not in the cluster to join the cluster; and detecting that the request by the second computer does not include an identifier of the at least one computer in the designated location, absence of the identifier of the at least one computer in the designated location indicating that the second computer does not request the at least one computer to be included in the cluster; and writing to the designated location to indicate that the request by the second computer to join the cluster will not be granted because the request did not include the identifier of the at least one computer.

9. A method as in claim 8 wherein writing to the designated location is performed in order to prevent new cluster formations for access to the shared storage system during at least one of the following conditions:

i) when computers requesting to join the cluster cannot communicate over the network to current members of the cluster;

ii) when a current member of the cluster has lost a network connection with another member of the cluster.

10. A method as in claim 1, wherein communicating with the multiple computers in the cluster through accesses to the shared storage system further includes:

periodically reading the designated location in shared storage system to identify a request by a second computer not in the cluster to form a new cluster;

detecting that an identifier of the at least one computer is included in information stored at the designated location, presence of the identifier of the at least one computer in the designated location indicating that the second computer requests that the at least one computer be included in the new cluster; and refraining from writing to the designated location to indicate that the request to create the new cluster will be granted.

11. A method as in claim 1 further comprising:

initiating addition of a computer which is coupled to the network and the shared storage system to be a new member of the cluster;

notifying other members of the cluster of the new member; and writing an updated list of members in the cluster including the new member to the designated location in the shared storage system, the updated list identifying computers in the cluster capable of accessing a common volume in the shared storage system.

12. A computer system which is one of multiple computers in a cluster having access to a shared storage system, the computer system comprising:

a processor;

a memory unit that stores instructions associated with an application executed by the processor;

a communication interface that supports communication with other computers having access to the shared storage; and an interconnect coupling the processor, the memory unit, and the communication interface, enabling the computer system to execute the application and perform operations of:

maintaining a list identifying which of the multiple computers are members of the cluster having access to the shared storage system;

communicating with the multiple computers in the cluster i) via use of a network supporting communications from the multiple computers amongst each other, and ii) through accesses to the shared storage system to which each of the computers in the cluster have access; and initiating a modification to members included in the cluster based upon communications over the network and through the shared storage system;

reading a designated location in the shared storage system to identify a request by a given computer not in the cluster to join the cluster, the request being written to the designated location by the given computer; and writing to the designated location to indicate whether or not the request to join the cluster will be granted.

13. A computer system as in claim 12, wherein communicating with the multiple computers in the cluster through accesses to the shared storage system involves members of the cluster reading and writing to designated locations in the shared storage.

14. A computer system as in claim 13, wherein the reading and writing to the designated locations of the shared storage system occurs in response to at least one of:

i) a non-member of the cluster trying to join the cluster but who is unable to communicate with the at least one computer over the network;

ii) a member of the cluster having lost an ability to communicate with other members of the cluster.

15. A computer system as in claim 12 that additionally performs operations of:

in response to the communicating, identifying which if any of the multiple computers in the cluster lacks an ability to communicate with each of the other computers in the cluster; and initiating removal of any computers from the list in which the corresponding computers lack the ability to communicate with each of the other computers in the cluster.

16. A computer system as in claim 12, wherein communicating with the multiple computers includes transmitting messages to each of the multiple computers in a cluster having corresponding links to access the shared storage, the corresponding links being independent of the network.

17. A computer system as in claim 12 that additionally performs operations of:

detecting a failed computer in the cluster of multiple computers based on lack of receiving messages from the failed computer;

notifying other non-failing computers in the cluster of multiple computers of the failed computer; and removing the failed computer from being a member of the cluster.

18. A computer system as in claim 17 that additionally performs operations of:

initiating removal of the failed computer from the list so that the failed computer is no longer a member of the cluster, the at least one computer communicating with other members in the cluster over the network to identify that the failed computer is no longer a member of the cluster, remaining members of the cluster other than the failed computer updating their corresponding lists to remove the failed computer from the cluster.

19. A computer system as in claim 12, wherein communicating with the multiple computers in the cluster through accesses to the shared storage system further includes:

detecting that an identifier of the at least one computer is not included in the designated area; and in response to the detecting, writing to the designated location to indicate that the request to join the cluster will not be granted.

20. A computer system as in claim 19, wherein writing to the designated location is performed in order to prevent new cluster formations for access to the shared storage when computers requesting to join the cluster cannot communicate over the network to current members of the cluster.

21. A computer system as in claim 12, wherein communicating with the multiple computers in the cluster through accesses to the shared storage system further includes:

periodically reading the designated location in shared storage of to identify a request by another computer not in the cluster to form a new cluster; and detecting that an identifier of the at least one computer is included in information stored at the designated location; and refraining from writing to the designated location to indicate that the request to create the new cluster will be granted.

22. A computer system as in claim 12 that additionally performs operations of:

initiating addition of a computer which is coupled to the network and the shared storage system to be a new member of the cluster;

notifying other members of the cluster of the new member; and writing an updated list of members in the cluster including the new member to the designated location in shared storage, the updated list identifying computers in the cluster capable of accessing a common volume in the shared storage system.

23. A method as in claim 1 further comprising:

maintaining the designated location to include a first region in which each of multiple non-member computers of the cluster are able to write their respective unique identifier values to request inclusion in the cluster.

24. A method as in claim 1 further comprising:

maintaining a time stamp value associated with the request by the first computer to join the cluster, the time stamp value indicating a respective time of the first computer requesting to be added to the cluster.

25. A method as in claim 1, wherein refraining from writing over the unique identifier in the designated location to indicate that the request by the first computer to join the cluster has been granted causes the first computer to be notified that the request to join the cluster has been granted.

26. A method as in claim 1 further comprising:

designating a particular computer of the multiple computers in the cluster to be a guardian computer to execute steps of periodically reading the designated location and refraining from writing over the unique identifier in the designated location.

27. A method as in claim 26 further comprising:

transmitting suppress messages from the guardian computer to other member computers of the cluster to prevent the other member computers in the cluster from acting as the guardian computer.

28. A method as in claim 27 further comprising:

discontinuing transmission of the suppress messages from the guardian computer to enable another member computer of the cluster to become the guardian that monitors the designated location and controls whether new non-member computers are allowed into the cluster.

* * * * *